US 8,042,280 B2

(12) United States Patent
Watanabe et al.

(10) Patent No.: US 8,042,280 B2
(45) Date of Patent: Oct. 25, 2011

(54) LENS SHAPE MEASUREMENT DEVICE

(75) Inventors: Takahiro Watanabe, Itabashi-ku (JP);
Kenichi Watanabe, Itabashi-ku (JP);
Kenji Miyashita, Itabashi-ku (JP);
Masahiro Jinbo, Shinjuku-ku (JP)

(73) Assignees: Kabushiki Kaisha Topcon, Tokyo (JP);
Hoya Corporation, Tokyo (JP)

( * ) Notice: Subject to any disclaimer, the term of this patent is extended or adjusted under 35 U.S.C. 154(b) by 0 days.

(21) Appl. No.: 12/809,183

(22) PCT Filed: Dec. 18, 2008

(86) PCT No.: PCT/JP2008/073038
§ 371 (c)(1),
(2), (4) Date: Jun. 18, 2010

(87) PCT Pub. No.: WO2009/078455
PCT Pub. Date: Jun. 25, 2009

(65) Prior Publication Data
US 2011/0146093 A1  Jun. 23, 2011

(30) Foreign Application Priority Data
Dec. 19, 2007  (JP) ................................. 2007-326786

(51) Int. Cl.
*G01B 1/00* (2006.01)
(52) U.S. Cl. .................................. 33/507; 33/28; 33/200
(58) Field of Classification Search ................... 33/507, 33/28, 200
See application file for complete search history.

(56) References Cited

U.S. PATENT DOCUMENTS

| 5,121,550 | A |   | 6/1992  | Wood et al. |             |
|-----------|---|---|---------|-------------|-------------|
| 5,465,495 | A | * | 11/1995 | Takubo      | 33/507      |
| 5,501,017 | A | * | 3/1996  | Suzuki      | 33/200      |
| 5,502,519 | A | * | 3/1996  | Hosoi       | 33/200      |
| 5,594,992 | A | * | 1/1997  | Suzuki et al. | 33/200    |
| 5,959,199 | A |   | 9/1999  | Suzuki et al. |           |
| 6,006,592 | A |   | 12/1999 | Suzuki et al. |           |
| 6,163,967 | A | * | 12/2000 | Suzuki et al. | 33/200    |
| 6,170,321 | B1 | * | 1/2001 | Suzuki et al. | 33/507    |
| 6,263,583 | B1 | * | 7/2001 | Mizuno      | 33/28       |
| 6,328,630 | B1 | * | 12/2001 | Jinbo et al. | 451/11    |
| 6,427,350 | B1 | * | 8/2002 | Asaoka et al. | 33/507   |
| 6,625,893 | B2 | * | 9/2003 | Suzuki et al. | 33/200   |
| 6,742,272 | B2 | * | 6/2004 | Eto et al.  | 33/507      |
| 7,069,107 | B2 | * | 6/2006 | Ueno        | 33/507      |

(Continued)

FOREIGN PATENT DOCUMENTS
DE     41 39 712    6/1992
(Continued)

OTHER PUBLICATIONS

International Search Report issued Mar. 10, 2009 in International (PCT) Application No. PCT/JP2008/073038.

*Primary Examiner* — Yaritza Guadalupe
(74) *Attorney, Agent, or Firm* — Wenderoth, Lind & Ponack, L.L.P.

(57) ABSTRACT

An arithmetic control circuit (52) is configured to bring the measuring element (38) for a lens into contact with at least two points (measurement points P1, P2) of one of two refracting surfaces of the lens Lm held in the lens holder by controlling the measuring element shifter (driving motor 6), obtain the coordinates of the two points according to the detection signal from the position detector (linear scales 24, 40), and obtain a curve value Cv of one refracting surface of the lens from the difference of the coordinates of the two points.

5 Claims, 24 Drawing Sheets

U.S. PATENT DOCUMENTS

| | | | |
|---|---|---|---|
| 7,441,895 B2 * | 10/2008 | Akiyama et al. | 351/206 |
| 7,500,315 B2 * | 3/2009 | Takeichi | 33/28 |
| 7,895,758 B2 * | 3/2011 | Watanabe | 33/200 |
| 2002/0026722 A1 * | 3/2002 | Suzuki et al. | 33/200 |
| 2002/0104226 A1 * | 8/2002 | Eto et al. | 33/507 |
| 2003/0182813 A1 * | 10/2003 | Suzuki et al. | 33/200 |
| 2005/0251280 A1 * | 11/2005 | Shibata | 33/200 |
| 2007/0118428 A1 * | 5/2007 | Akiyama et al. | 705/26 |
| 2009/0007444 A1 * | 1/2009 | Shibata | 33/200 |
| 2009/0282688 A1 * | 11/2009 | Watanabe | 33/200 |
| 2010/0064533 A1 * | 3/2010 | Miyashita | 33/200 |
| 2011/0146093 A1 * | 6/2011 | Watanabe et al. | 33/507 |

FOREIGN PATENT DOCUMENTS

| | | |
|---|---|---|
| DE | 697 13 992 | 4/2003 |
| EP | 0 844 047 | 5/1998 |
| FR | 2 669 999 | 12/1991 |
| GB | 2 251 945 | 7/1992 |
| JP | 62-137510 | 6/1987 |
| JP | 4-332802 | 11/1992 |
| JP | 8-294855 | 11/1996 |
| JP | 10-166250 | 6/1998 |
| JP | 10-217086 | 8/1998 |
| JP | 10-328992 | 12/1998 |

* cited by examiner

RELATIONSHIP BETWEEN DIFFERENCE IN Z-DIRECTION AND CURVE VALUE $y = 3.3695 \Delta L + 0.0809$

LENS SHAPE MEASUREMENT DEVICE

TECHNICAL FIELD

The present invention relates to a lens shape measurement device which measures a lens shape of eyeglasses.

BACKGROUND ART

In general, as eyeglass frames, a rim frame (full rim frame), a rimless frame (two-point frame), a grooved frame (half-rim and Nylor) and the like are known.

In the grooved frame, for example, a retention groove which extends in the circumferential direction is formed on an outer circumferential face of a lens, a half-rim is firmly affixed to the upper side of the lens (eyeglass lens), and Nylor which is supported by both ends of the half-rim is arranged in the retention groove in the lower side of the lens, so that the lens is affixed to the half rim by Nylor.

For this grooved frame, it is necessary to form the retention groove extending in the circumferential direction on the outer circumferential face of the lens. This retention groove is obtained by forming a circular groove extending in the circumferential direction on the outer circumferential face of the lens by a cutter and the like after the rim of the circular unprocessed eyeglass lens is formed into the lens (eyeglass lens) shape by a lens grinder according to lens shape data.

Meanwhile, a lens shape measurement device disclosed in JP H10-166250A is known. The lens shape measurement device disclosed in JP H10-166250A includes a lens frame holder provided in the main body of the measurement device, a rotation base provided in a frame of the main body in a horizontally rotatable manner, and a rotation and driving motor which rotates and drives the rotation base. The lens shape measurement device also includes a slider mounted on the rotation base in a linearly movable manner in the horizontal direction, a measurement shaft mounted on the slider in a vertically movable manner, and a measuring element for a lens frame which is set in the upper end portion of the measurement shaft and engages with a V-groove of a lens frame of a rim frame.

In this lens shape measurement device, a moving radius $\rho i$ (a change in a distance from a geometric center of a lens frame to a V-groove) relative to a rotation angle $\theta i$ of the rotation base and a displacement $Zi$ in the up and down direction can be obtained as lens frame shape data ($\theta i, \rho i, Zi$) by moving the measuring element for a lens frame along the V-groove.

As the above lens shape measurement device, a device in which a lens holder (lens holding unit) which holds a lens is detachably attached to a main body and a measuring element for a lens is arranged in a slider to freely rise up and fall is known. In this lens shape measurement device, the measuring element for a lens is set up and has contact with the outer circumferential face of the lens held by the lens holder, and the rotation base horizontally rotates by the rotation and driving motor, so that the measuring element for a lens is slidably moved in the circumferential direction along the outer circumferential face of the lens, and the moving radius $\rho i$ (a change in a distance from a geometric center or an optical center of a lens to a rim) of the lens relative to the rotation angle $\theta i$ of the rotation base can be obtained as lens circumferential face shape data ($\theta i, \rho i$).

In this lens shape measurement device, the shape data of the lens frame is obtained as the above-described three-dimensional shape data; however, the shape data of the lens is two dimensionally obtained as a moving radius $\rho i$ relative to a rotation angle $\theta i$.

Consequently, in order to process the retention groove on the lens, it is necessary to hold an unprocessed eyeglass lens between lens rotation shafts which are mounted on a lens grinder in series, rotate the lens rotation shafts and the unprocessed eyeglass lens together at a predetermined angle $\Delta\theta$ before grinding the rim portion of the unprocessed eyeglass lens according to the circumferential face shape data ($\theta i, \rho i$) by a grinding stone, and measure positional data in the direction along the lens rotation shafts of the front side refracting surface and the back side refracting surface in the moving radius $\rho i$ of the unprocessed eyeglass lens by an edge thickness measurement unit.

Meanwhile, when ordering eyeglasses in opticians, for example, it is general to select one's favorite eyeglasses from displayed sample eyeglasses. In an actual situation for such sample eyeglasses, demo-lenses (dummy lenses) are attached to a frame or a rimless frame. The circumferential face (edge face) of the demo-lenses attached to the frame (rim) is formed in a shape along the three-dimensional shape of the frame (rim).

However, an actual eyeglass lens has a difference in a curvature of a refracting surface according to a prescription of the eyeglasses, or in an edge thickness according to a rotation center of a lens in the grinding of the rim of the lens. For this reason, in a grooved frame, when mounting an actual eyeglass lens on a half-rim, a bending process is performed to the half rim according to the rim shape of the eyeglass lens.

However, it is desirable to mount the eyeglass lens on the half-rim frame without performing such a bending process for a half-rim. In order to achieve that, it is necessary to measure a three-dimensional shape of a half-rim; however, in the above-described measurement device, a three-dimensional shape of a half-rim can not be measured.

It is, therefore, an object of the present invention to provide a lens shape measurement device which can specify a three-dimensional shape of a half-rim frame even in a grooved frame by obtaining a circumferential face shape and a curvature of a refracting surface of a lens such as a demo-lens.

Disclosure of the Invention

In order to achieve the above object, a lens shape measurement device of the present invention includes a lens holder set in a measurement device main body, a measuring element for a lens configured to measure a rim shape of a lens held in the less holder, a measuring element shifter configured to displace the measuring element for a lens along an outer circumferential face of the lens, a position detector configured to detect a coordinate of the measuring element for a lens, and an arithmetic control circuit configured to obtain circumferential face shape data of the lens according to a detection signal from the position detector as two-dimensional information. Moreover, the arithmetic control circuit is configured to bring the measuring element for a lens into contact with at least two points of one of two refracting surfaces of the lens held in the lens holder by controlling the measuring element shifter, obtain coordinates of the two points according to the detection signal from the position detector, and obtain a curve value which is a curvature of one refracting surface of the lens from the coordinates of the two points.

According to the present invention, the three-dimensional shape of a half-rim can be specified by obtaining the curvature of a refracting face and a circumferential face shape of a lens such as a demo-lens even in a grooved frame.

BEST MODE FOR CARRYING OUT THE INVENTION

Hereinafter, an embodiment of the present invention will be described with reference to the drawings.

[Configuration]

Figure 1:
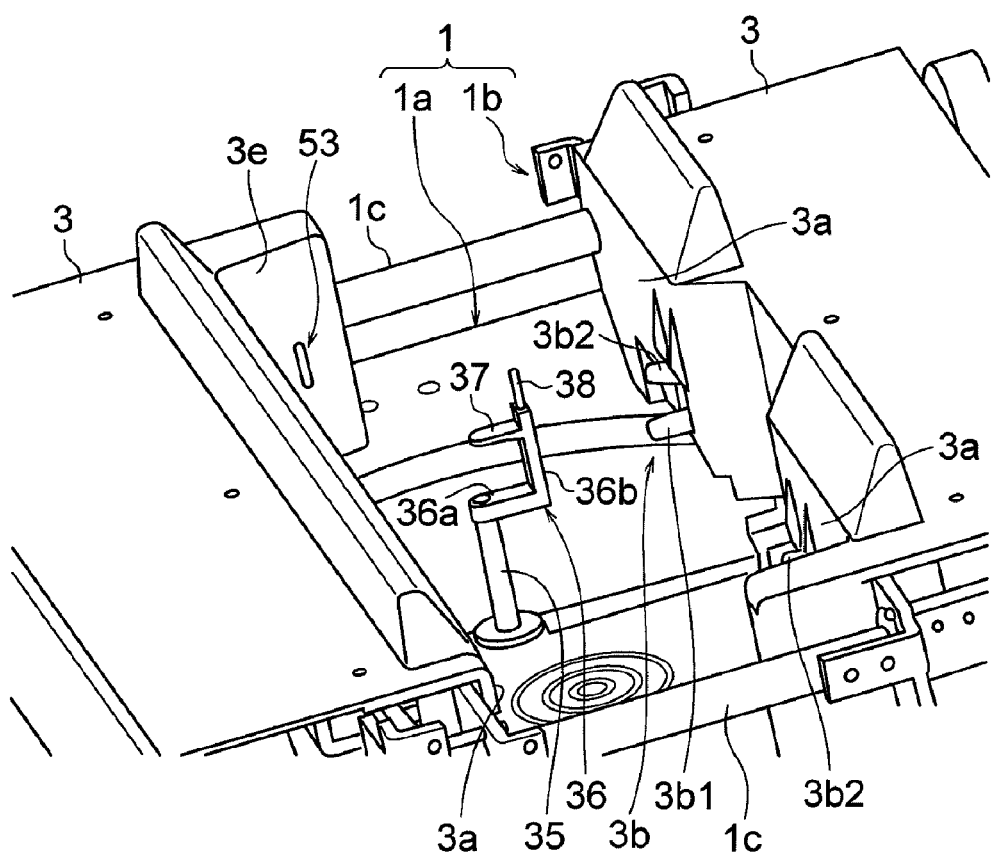
FIG. 1 is a partially schematic perspective view illustrating a lens shape measurement device according to the present invention.

A lens shape measurement device according to the present invention is used for measuring a shape of a lens such as a template, a demo-lens or a lens frame. In this case, a distance (diameter) from a geometric center of a lens to a circumferential face of a lens is changed in a plurality of positions in the circumferential direction of the lens, so that a diameter in which this distance is changed can be a moving radius. FIG. 1 illustrates a lens shape measurement device which measures this moving radius. The lens shape measurement device includes a measurement device main body 1.

This measurement device main body 1 includes in a lower portion thereof a case portion 1a for housing the measurement mechanism and a lens frame holding mechanism 1b provided above the case portion 1a. The case portion 1a in FIG. 1 includes inside thereof a bottom portion provided with a base 2 illustrated in FIG. 2.

The lens frame retaining mechanism 1b includes a pair of parallel guide rods (guide members) 1c, 1c fastened to the case portion. Slide frames 3, 3 are retained by the guide members 1c, 1c, which can relatively move closer and move away. These slide frames 3, 3 are biased by a coil spring and the like in the direction where they come close to each other. These slide frames 3, 3 include facing longitudinal walls 3a, 3a with which a lens frame (not shown) of eyeglasses has contact. The slide frames 3, 3 include a lens frame holder 3b which holds a lens frame as a lens frame holding unit. This lens frame holder 3b includes a lower side holding bar 3b1 which projects from the longitudinal wall 3a and an upper side holding bar 3b2 which is attached to the slide frame 3 in openable and closable manner with respect to the holding bar 3b1 from the upper side. The lens frame holder 3b is attached to each of right and left lens frames of not shown eyeglasses. In addition, as the lens frame holding mechanism 1b, a configuration disclosed in JP H10-328992A, for example, or other known arts can be adopted. Thus, the detailed description of the lens frame holding mechanism 1b is omitted.

[Measurement Mechanism]

A measurement mechanism 1d illustrated in FIGS. 2-5 is installed on the base 2. This measurement mechanism 1d includes a base supporting member 4 fastened on the base 2. This base supporting member 4 includes a large diameter driven gear 5 to be horizontally rotatable about a vertical axis. The base 2 includes a driving motor 6 schematically illustrated in FIG. 5A adjacent to the driven gear (timing gear) 5. This driving motor 6 includes an output shaft 6a. A pinion (timing gear) 7 is fastened to the output shaft 6a. A timing belt 8 is stretched over the pinion 7 and the driven gear 5.

Upon the driving of the driving motor 6, the rotation of the output shaft 6a of the driving motor 6 is transferred to the driven gear 5 via the pinion 7 and the timing belt 8, and the driven gear 5 rotates. In addition, the driving motor 6 is a biphasic stepping motor.

As illustrated in FIGS. 2-5, a rotation base 9 is integrally fastened on the driven gear 5. This rotation base 9 includes a photosensor 9a as an origin detector i.e., an origin detection unit. In this case, for example, a light emitter 9b for indicating an origin position is placed on the base 2 as a light emitting unit. A linear or point-like light flux is irradiated from the light emitter 9b upwardly as an origin mark, and if the photosensor 9a detects the light flux as an origin mark, the origin position of the horizontal rotation of the rotation base 9 can be obtained. The origin detector includes the photosensor 9a and the light emitter 9b. As an origin detector, known arts such as a transparent photosensor, a refracting type photosensor or an adjacent photosensor can be adopted.

Figure 2:
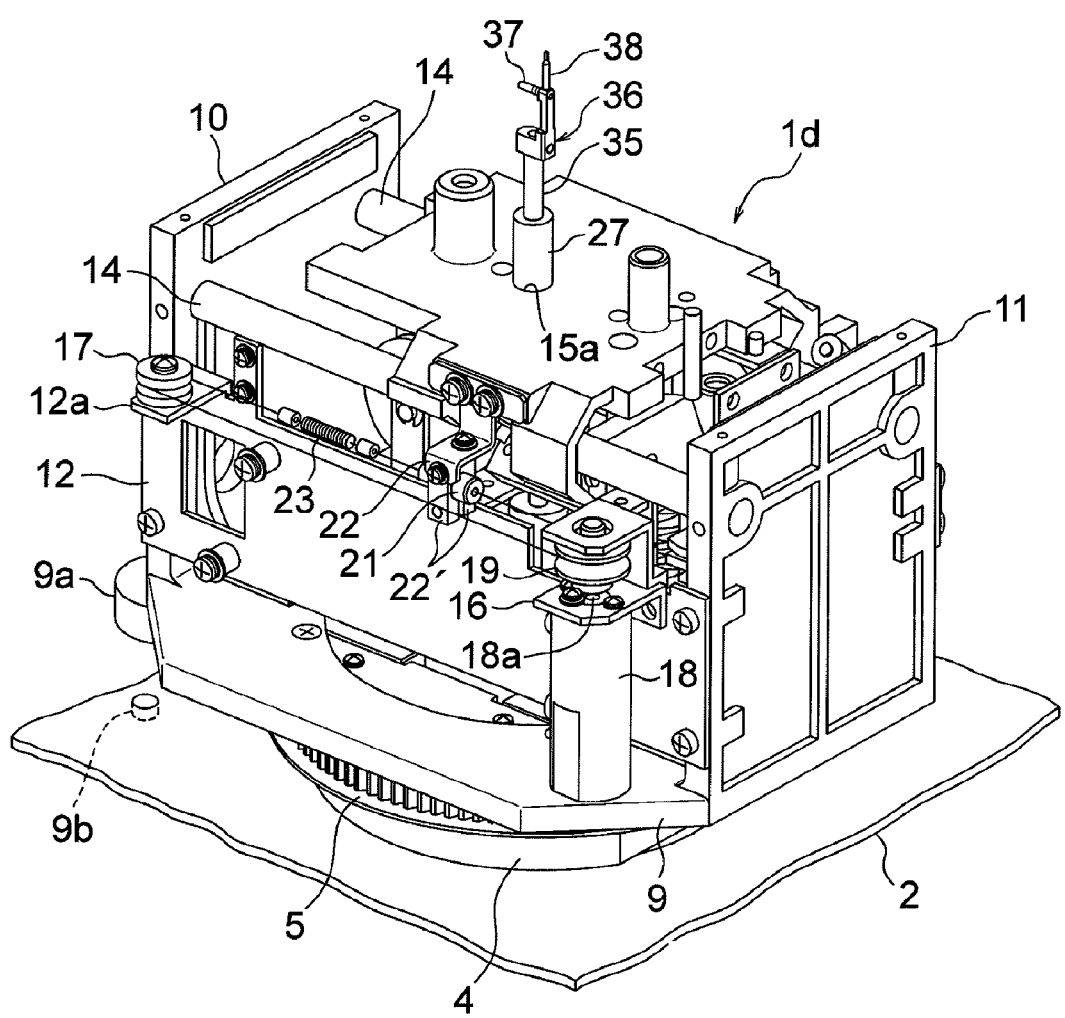
FIG. 2 is a perspective view illustrating a measurement mechanism of the lens shape measurement device in FIG. 1.
Figure 3:
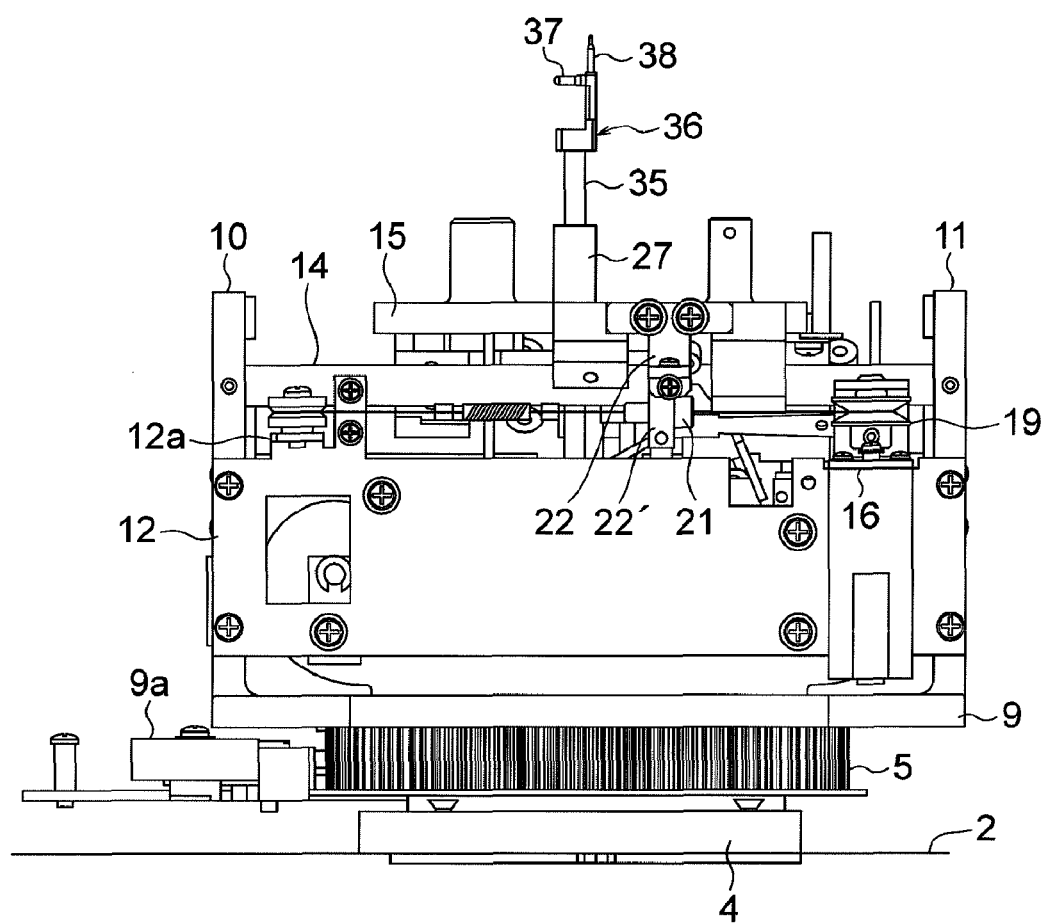
FIG. 3 is a front view of the measurement mechanism in FIG. 2.
Figure 4:
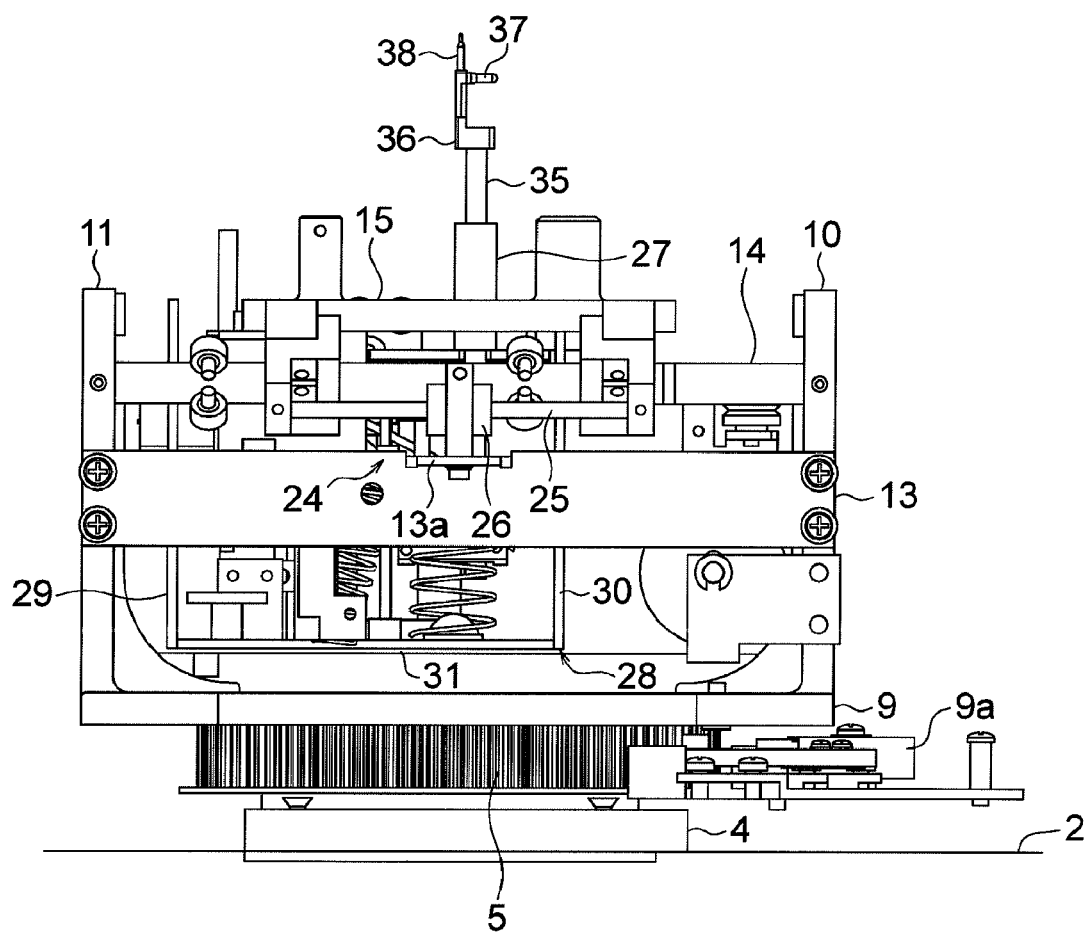
FIG. 4 is a back view of the measurement mechanism in FIG. 2.

Facing parallel rail attachment plates 10, 11 each of which extends upwardly illustrated in FIGS. 2-4 are integrally fastened to both of the end portions of the rotation base 9 in the longitudinal direction. As illustrated in FIG. 3, end portions of a side plate 12 in the longitudinal direction are fastened to one side portion of the rail attachment plate 10 and one side portion of the rail attachment plate 11. As illustrated in FIG. 4, end portions of a side plate 13 in the longitudinal direction are fastened to the other side portion of the rail attachment plate 10 and the other side portion of the rail attachment plate 11.

As illustrated in FIGS. 2-4, a pair of parallel shaft-like guide rails 14, 14 are horizontally arranged between the upper portions of the facing rail attachment plates 10, 11. Both of the end portions of each guide rail 14 are fastened to the rail attachment plates 10, 11, and a slider 15 is retained by the guide rails 14, 14 to be movable in the longitudinal direction.

Moreover, as illustrated in FIGS. 2, 3, a pulley supporting plate portion 12*a* which horizontally projects towards the side is integrally formed with the side plate 12 adjacent to the rail attachment plate 10 by bending, and a bracket 16 for attaching a motor is fastened to the side plate 12 adjacent to the rail attachment plate 11.

A driven pulley 17 is attached to the pulley supporting plate portion 12*a* to be horizontally rotatable about an axis line extending up and down. An upper end portion of a driving motor 18 for moving a slider is fastened to the bracket 16. A DC motor is used for this driving motor 18. The axis line of the output shaft 18*a* of the driving motor 18 is vertically directed, and a driving pulley 19 is attached to the output shaft 18*a* as illustrated in FIGS. 5B, 5C.

A circular wire 20 is stretched over the pulleys 17, 19. A portion adjacent to one end portion of the wire 20 is held by a shaft-like wire holding member 21. This wire holding member 21 is fastened to the slider 15 via brackets 22, 22'. Both of the end portions of the wire 20 are connected via a coil spring 23. Thereby, upon the normal rotation or the reverse rotation of the driving motor 18, the output shaft 18*a* and the driving pulley 19 normally rotate or reversely rotate, so that the slider 15 is displaced right or left in FIG. 3.

Figure 5:
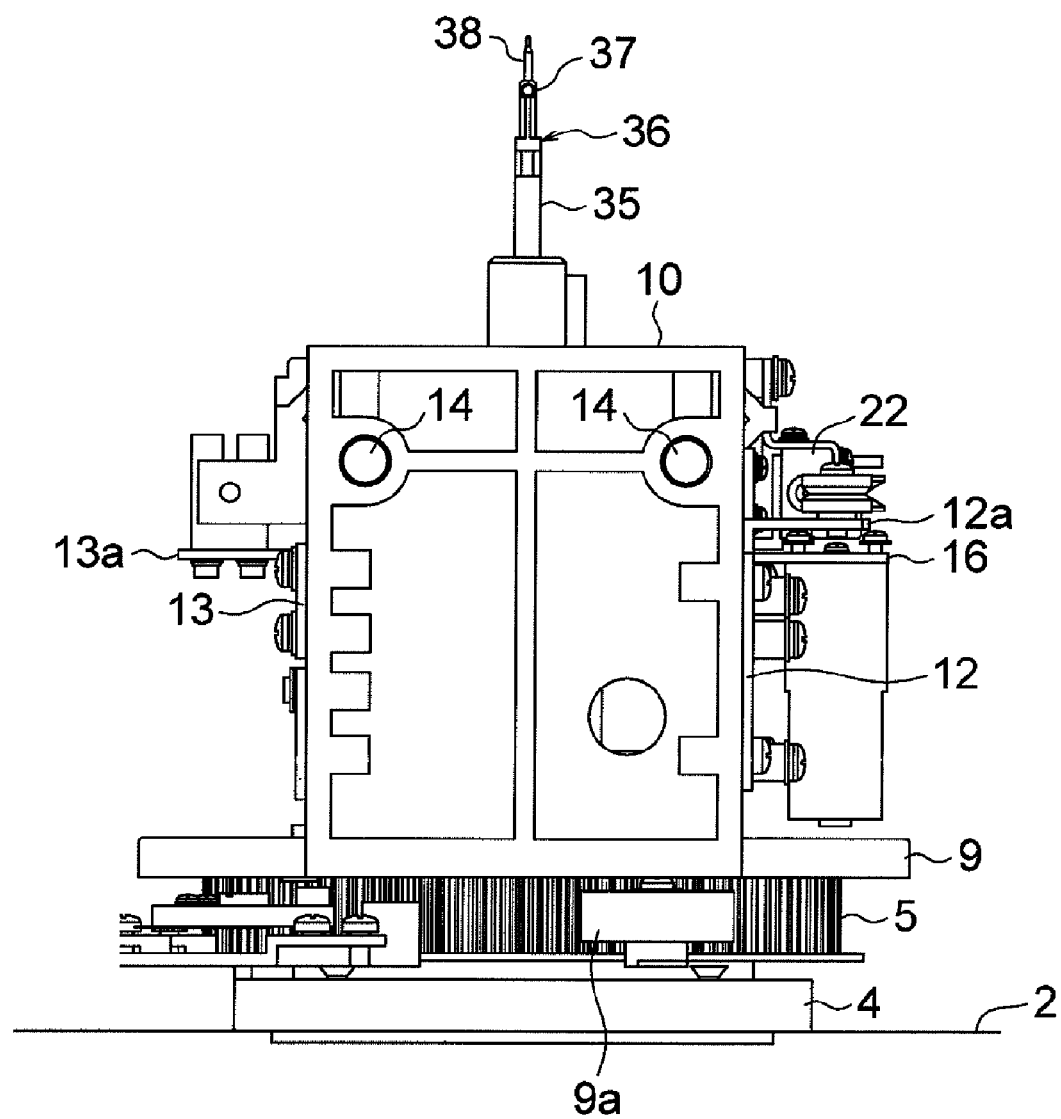
FIG. 5 is a right side view of the measurement mechanism in FIG. 4.
Figure 5A:
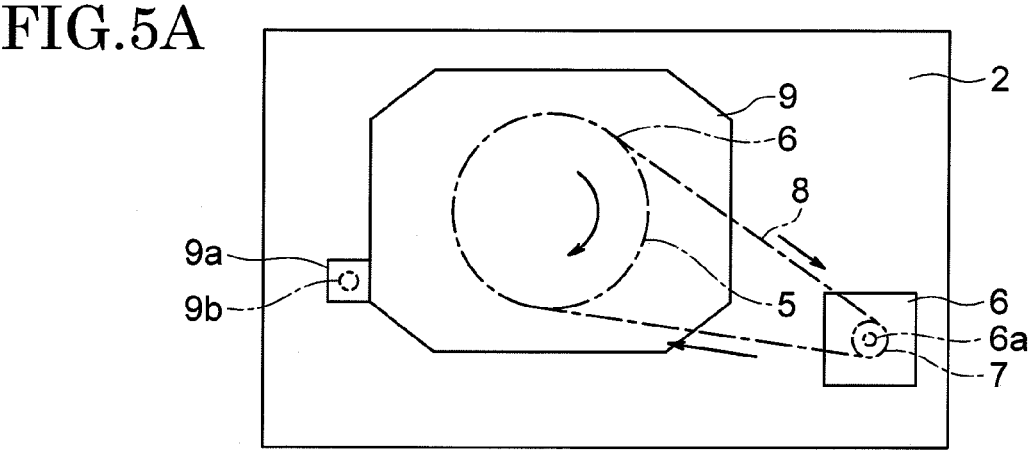
FIG. 5A is a pattern diagram illustrating a driver of a rotation base of the measurement mechanism in FIG. 2.
Figure 5B:
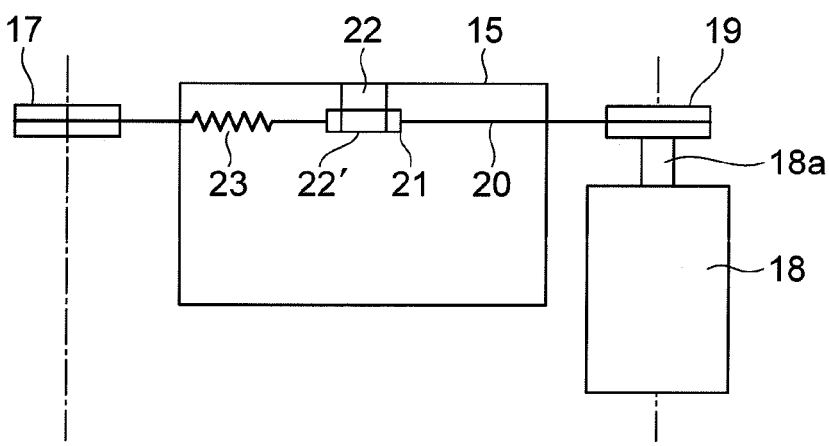
FIG. 5B is a pattern diagram describing a slider driving mechanism in FIG. 2
Figure 5C:
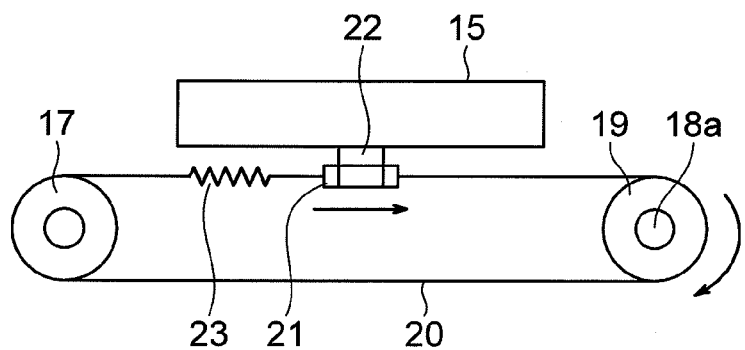
FIG. 5C is a plan view of FIG. 5B.
Figure 5D:
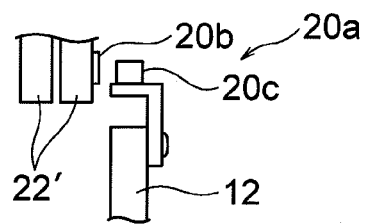
FIG. 5D is a schematic view describing an origin detector of the slider in FIG. 2.

As illustrated in FIG. 5D, an origin sensor 20*a* which detects an origin of a displaced position (displacement) of the slider 15 is arranged between the bracket 22' and the side plate 12 as an origin detection unit, i.e., an origin detector. A reflection type sensor is used for this origin sensor 20*a*. This sensor includes a reflection plate 20*b* having a slit-like reflection face (not shown) extending up and down, and a reflection type photosensor 20*c* having a light emitting element and a light receiving element. The refection plate 20*b* is set in the bracket 22' and the photosensor 20*c* is set in the side plate 12.

As the origin sensor 20*a*, a known technique such as a transparent photosensor and a proximity photosensor can be adapted.

A supporting plate portion 13*a* which horizontally projects to the side as illustrated in FIG. 5 is integrally formed in the central portion of the side plate 13 in FIG. 4 in the longitudinal direction by bending. A linear scale 24 which detects the displaced position of the slider 15 of the horizontal direction in the extending direction of the guide rail 14 is arranged between the side plate 13 and the slider 15 as illustrated in FIG. 4. This linear scale 24 functions as a position detector (position detection unit) which is used when detecting a plurality of positions in the circumferential direction of the circumferential face of the lens, i.e., a moving radius detection sensor (moving radius detector) for use when detecting a moving radius of a lens This linear scale 24 includes a shaft-like main scale 25 held by the slider 15 parallel to the guide rail 14 and a detection head 26 which is fastened to the supporting plate portion 13*a* and reads the positional information of the main scale 25. This detection head 26 detects the displaced position of the slider 15 in the horizontal direction from the information for detecting the position of the main scale 25. For example, a known magnetic scale or optical scale can be used for this linear scale 24.

For instance, in a magnetic scale, a magnetic pattern S, N is alternately provided at minute intervals as information for detecting a position (information for detecting displacement) in the axis line direction of the main scale 25, and the magnetic pattern is detected by a detection head (a head for detecting a magnetic change) 26, so that the displacement (displaced position) of the slider 15 can be detected. Meanwhile, in an optical scale, the main scale 25 is formed in a plate-like form and fine interval slits are provided in the longitudinal direction of the main scale 25, and a light emitting element and a light receiving element are placed to sandwich the main scale 25 and the light from the light emitting element is detected by the light receiving element via the slits of the main scale 25, so that the displacement (displaced position) of the slider 15 can be detected by obtaining the number of slits.

The slider 15 includes in the substantial center thereof a through hole 15*a* as illustrated in FIG. 2. A guide tube 27 extending vertically is inserted into the thorough hole 15*a*. A supporting frame 28 is arranged on the lower side of the slider 15 as illustrated in FIG. 4. This supporting frame 28 includes longitudinal frames 29, 30 each having an upper end portion retained by the slider 15 and a transverse board (bottom plate) 31 fastened to the lower end portions of the longitudinal frames 29, 30.

Figure 8:
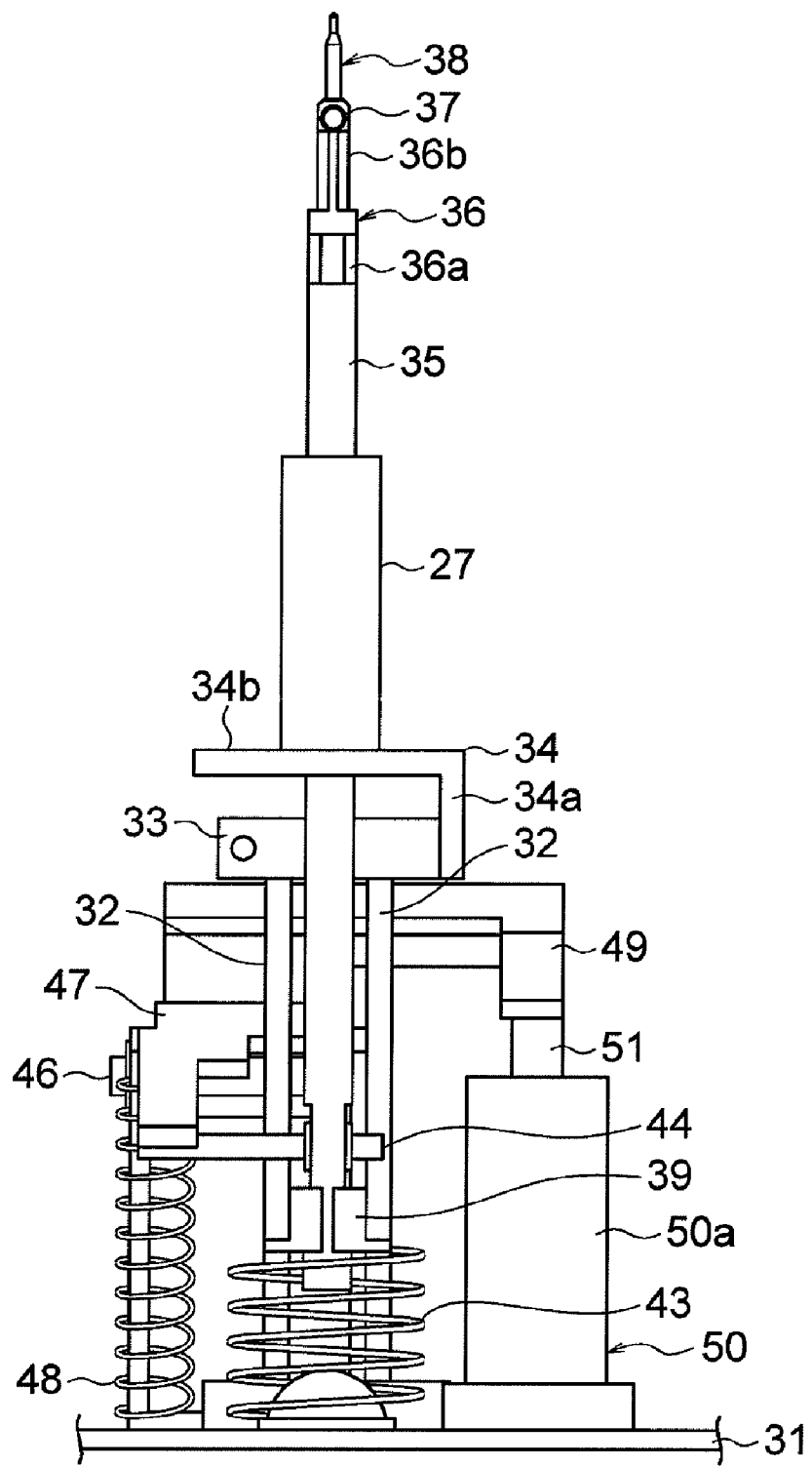
FIG. 8 is a left side view of FIG. 7.

Lower end portions of a pair of parallel shaft-like supporting members 32, 32 extending up and down are fastened to the transverse plate (bottom plate) 31 (refer to FIG. 8). A holding member (connection member) 33 is fastened to the upper end portions of the supporting members 32, 32, and a longitudinal wall 34*a* of a guide supporting member 34 having a L-shaped side face is fastened to the holding member 33. The lower end portion of the guide tube 27 is fastened on a transverse wall (upper wall) 34*b* of the guide supporting member 34.

A measuring element shaft 35 extending vertically is fitted into the guide tube 27 in a vertically movable manner, and a measuring element attachment member 36 is integrally set in the upper end portion of the measuring element shaft 35. This measuring element attachment member 36 includes an L-shape having an attachment portion 36*a* vertically arranged in the upper end portion of the measuring element shaft 35 and a vertical portion 36*b* extending upward from the attachment portion 36*a*. A measuring element 37 for a lens frame is integrally set in the upper end portion of the vertical portion 36*b* parallel to the attachment portion 36*a*.

Figure 9:
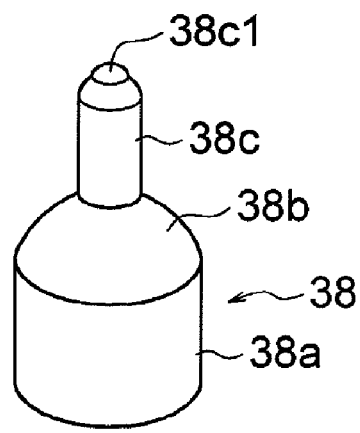
FIG. 9 is a partially schematic perspective view illustrating a measuring element for a lens illustrated in FIG. 1.
Figure 10:
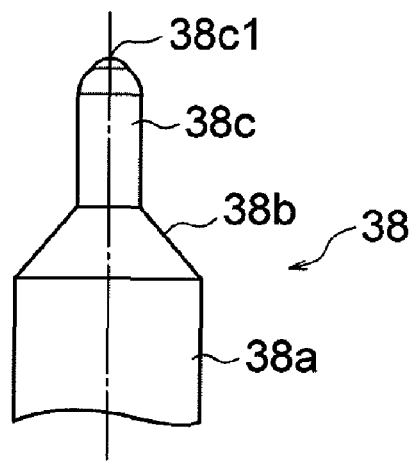
FIG. 10 is a side view of FIG. 9.

A measuring element 38 for a lens which projects upwardly is integrally set in the upper end of the measuring element attachment member 36 as illustrated in FIGS. 9, 10. This measuring element 38 includes a shaft-like measurement portion 38*a* attached on the upper end of the vertical portion 36*b* of the measuring element attachment member 36 parallel to the axis line of the measuring element shaft 35, a tapered portion 38*b* arranged on the upper end portion of the shaft-like measurement portion 38*a*, and a small diameter hole engagement shaft portion 38*c* attached on the upper end of the tapered portion 38*b*. The upper end (leading end) portion of the hole engagement shaft portion 38*c* is formed into a hemisphere shape, and a leading end 38*c*1 is aligned with the axis line of the shaft-like measurement portion 38b. A step face 38d as a corner measurement portion is arranged on the upper end of the measuring element attachment member 36 in the outer circumference of the base portion of the shaft-like measurement portion 38a. The edge corner of the lens Lm has contact with the corner between the shaft-like measurement portion 38a and the step face 38d when measuring the shape of the lens Lm by the measuring element for a lens.

Figure 6:
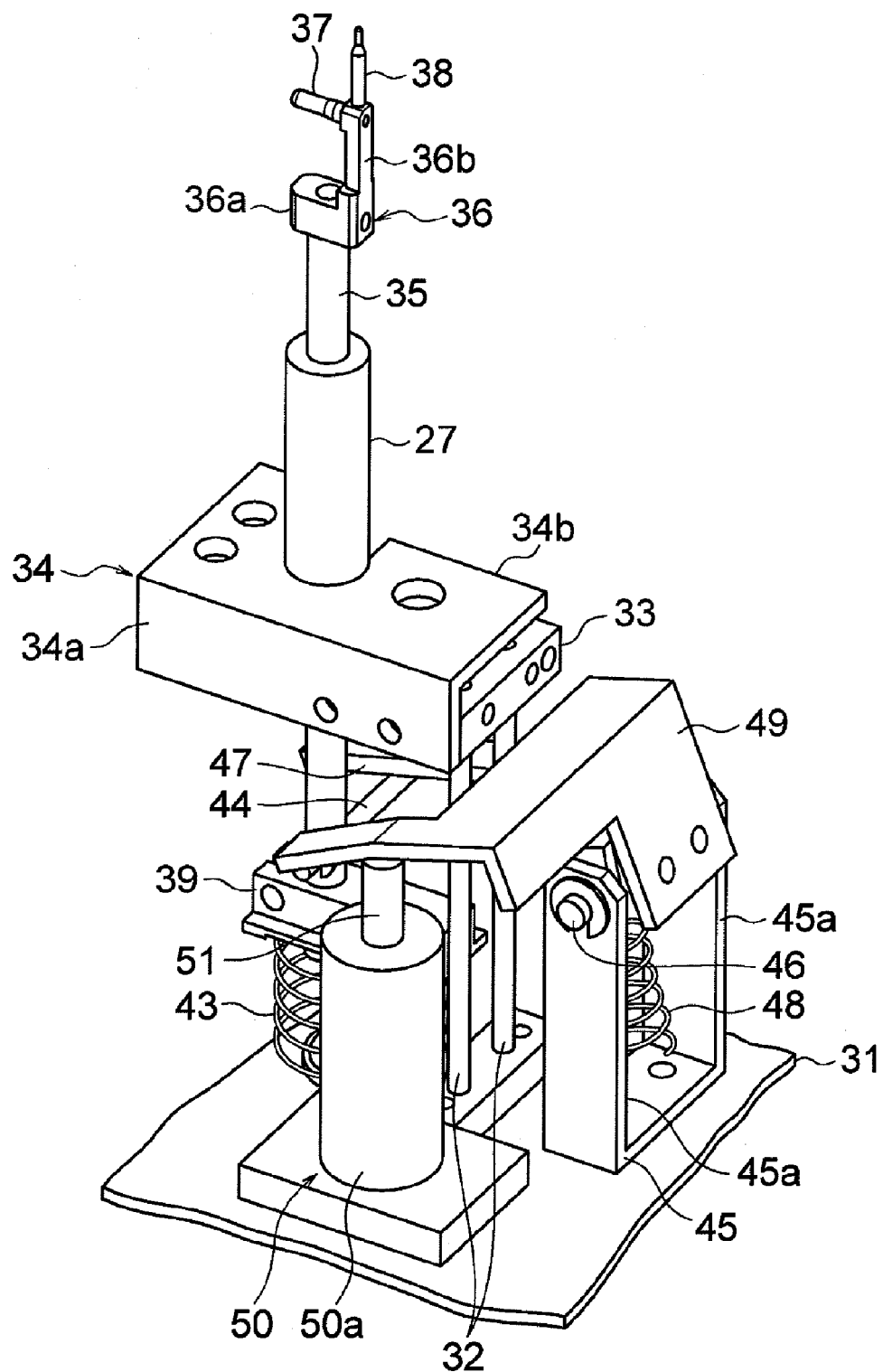
FIG. 6 is a perspective view illustrating a moving-up-and-down mechanism of a measuring element in FIG. 2.
Figure 7:
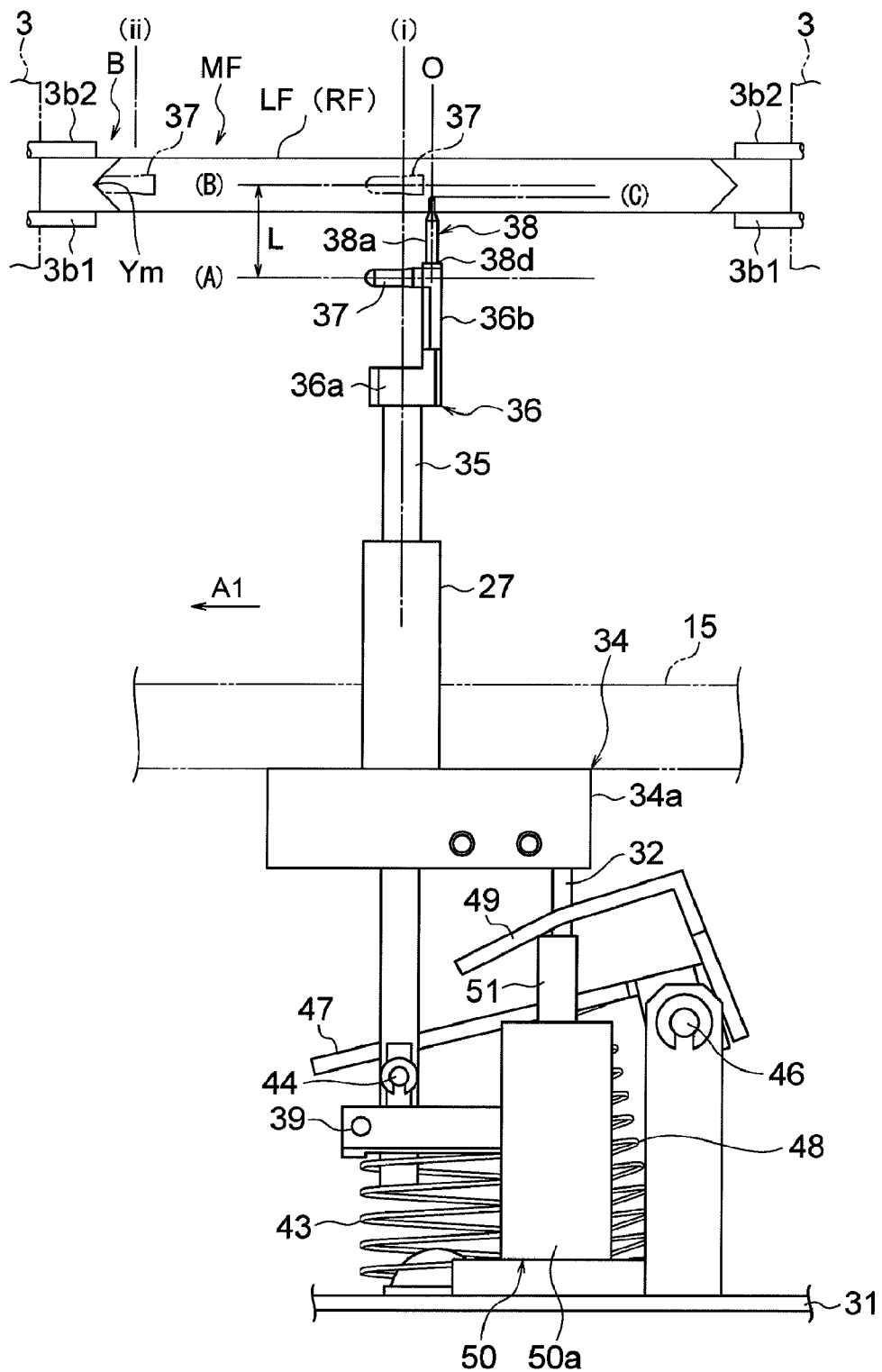
FIG. 7 is a view describing measurement of a lens frame by the moving-up-and-down mechanism in FIG. 6.
Figure 13:
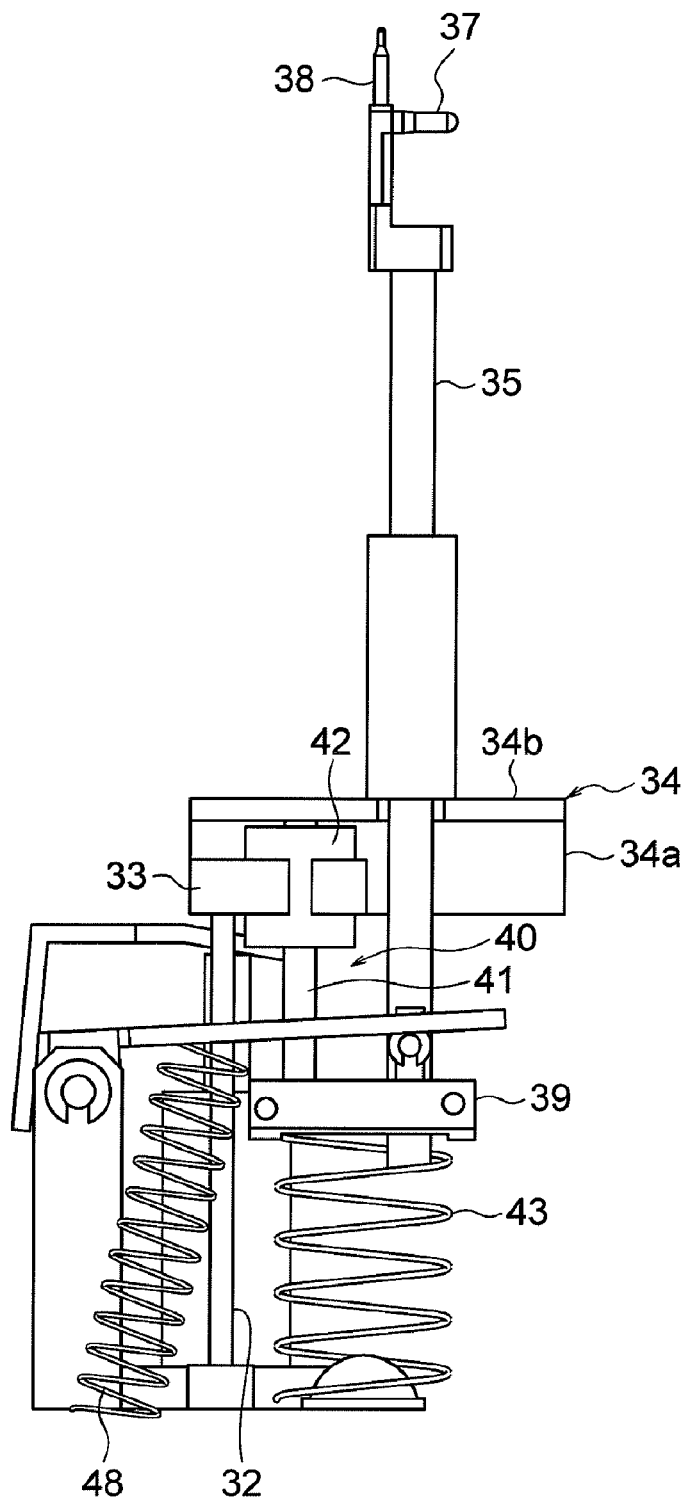
FIG. 13 is a view describing a linear scale of the moving-up-and-down mechanism in FIG. 11.
Figure 14:
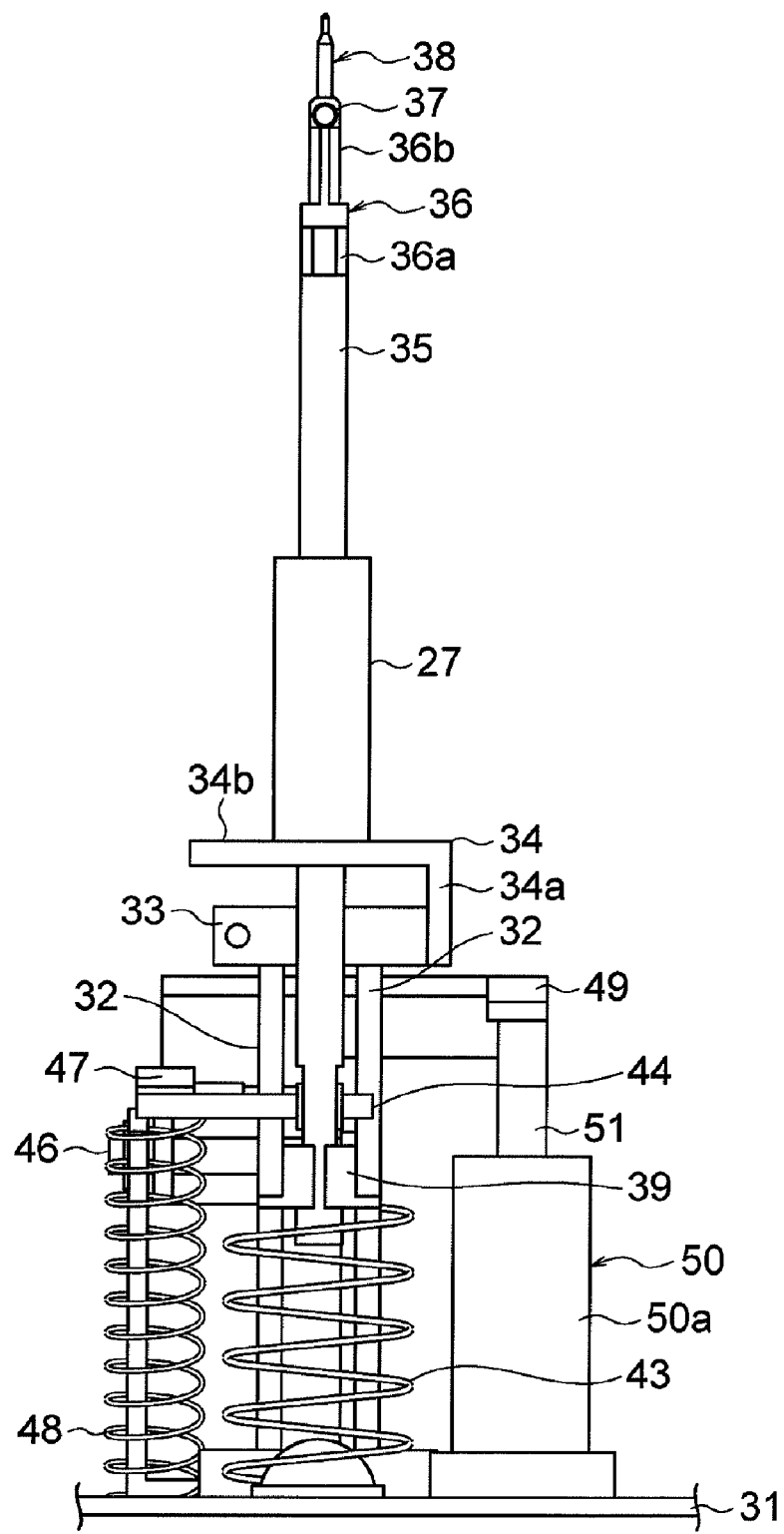
FIG. 14 is a right side view of FIG. 13.

The arithmetic control circuit 52 controls the driving of the measuring element movement unit (driving motor 6) such that the circumferential face measurement portion (shaft-like measurement portion 38a) has contact with the outer circumferential face and is moved in the circumferential direction while bringing the corner measurement portion (step face 38d) into contact with the edge corner. As illustrated in FIGS. 6-8, a bracket 39 is fastened to the lower end portion of the measuring element shaft 35. Moreover, as illustrated in FIG. 13, a linear scale 40 which detects a displaced position in the vertical direction is placed between the bracket 39 and the guide supporting member 34 as a position detector (position detection unit) in the vertical direction, i.e., a height detection sensor (a height detector of a height detection unit).

This linear scale 40 includes a shaft-like main scale 41 placed in parallel with the measuring element shaft 35 toward up and down and a detection head 42 which detects displaced positions of the measuring elements 37, 38 in the vertical direction from the displacement of the main scale 41 in the vertical direction. The main scale 41 has the upper end portion fastened to the holding member 33 and the lower end portion fastened (held) to the bracket 39. The detection head 42 is held by the holding member 33. For this linear scale 40, a magnetic scale or an optical scale can be adopted similar to the above-described linear scale 24.

As illustrated in FIGS. 6-8, a coil spring 43 which biases the measuring element shaft 35 upwardly is arranged between the bracket 39 and the transverse plate (bottom plate) 31. An engagement shaft 44 which is located above the bracket 39 and is orthogonal to the measuring element shaft 35 is attached in the vicinity of the lower end portion of the measuring element shaft 35. A bracket 45 formed into a U-shape as illustrated in FIG. 6 is fastened on the transverse plate (bottom plate) 31. Both end portions of a supporting shaft 46 are held by facing walls 45a, 45a of the bracket 45 in a rotatable manner about an axis line, and a pressure lever 47 is fastened to the supporting shaft 46. This pressure lever 47 has contact with the upper portion of the engagement shaft 44. Moreover, a coil spring 48 for lowering a lever is arranged between the pressure lever 47 and the transverse plate 31. A tension spring force of this tension coil spring 48 is set to be larger than a spring force of the coil spring.

An elevation position control lever 49 is fastened to the supporting shaft 46. This elevation position control lever 49 controls an elevation position of the engagement shaft 44 by the pressure lever 47 and sets the elevation positions of the measuring element shaft 35 and the measuring element for a lens frame 37 and the measuring element for a lens 38. This elevation position control lever 49 extends in the direction which is the same as that of the pressure lever 47.

An actuator motor 50 is placed on the lower side of the elevation position control lever 49. This actuator motor 50 includes a motor main body 50a fastened on the transverse plate 31 and a shaft 51 which projects upwardly from the motor main body 50a and has the axis line parallel to the measuring element shaft 35. The elevation position control lever 49 has contact with the upper end of the shaft 51 by the tension spring force of the coil spring 48.

In addition, a DC motor is used for this actuator motor 50. The shaft 51 moves upwardly by the normal rotation of the actuator motor 50 and the shaft 51 moves downwardly by the reverse rotation of the actuator motor 50.

[Control Circuit]

Figure 10A:
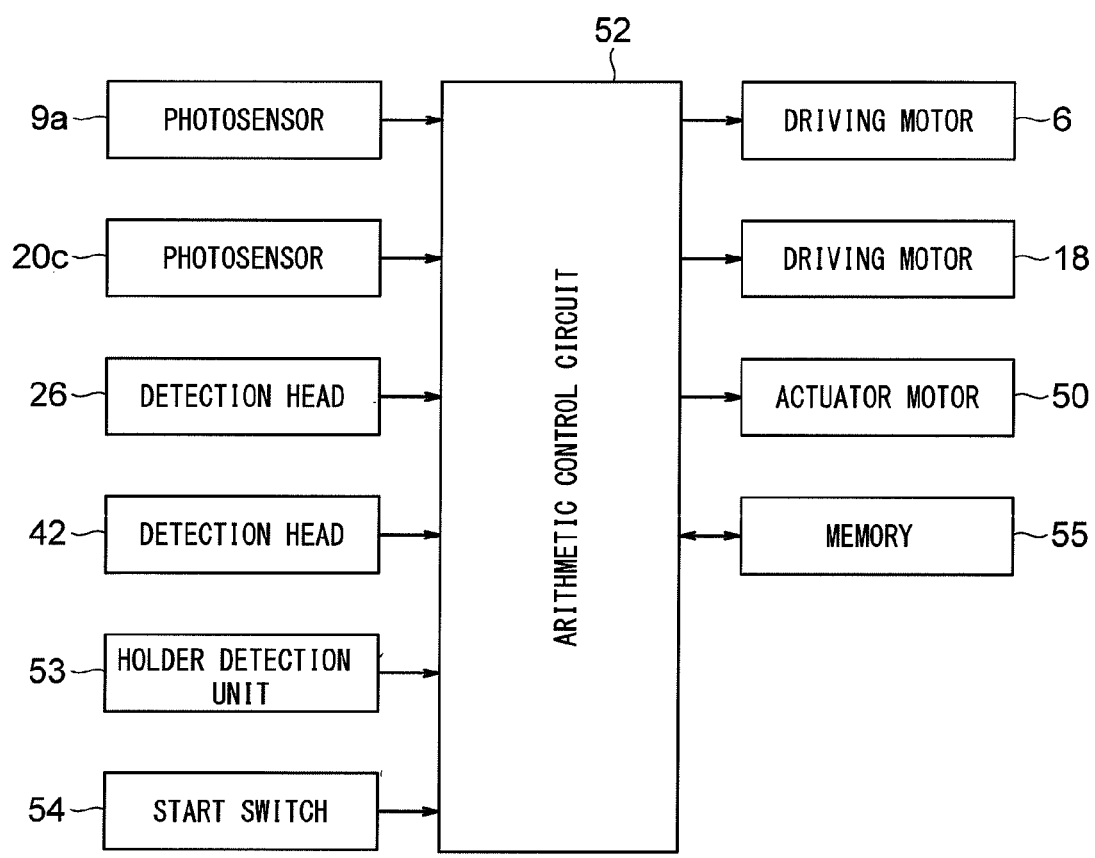
FIG. 10A is a control circuit diagram of the lens shape measurement device illustrated in FIG. 1.

As illustrated in FIG. 10A, an origin detection signal from the above photosensor (origin detector) 9a, an origin detection signal from the photosensor 20c of the origin detector (origin detection unit), a displacement detection signal (position detection signal) from the detection head 26 of the linear scale 24, the displacement detection signal (position detection signal) from the detection head 42 of the linear scale 40 and the like are input to the arithmetic control circuit (control circuit) 52. The arithmetic control circuit 52 controls the driving of the driving motors 6, 18 and the actuator motor 50.

A holder detector 53 as illustrated in FIG. 1 is set in one side wall of the slide frames 3, 3 as a holder detector. A micro-switch and the like are used for the holder detector 53. The detection signal from the holder detector 53 is input into the arithmetic control circuit 52 as illustrated in FIG. 10A. In the figure, reference number 54 is a start switch for measurement.

[Function]

Hereinafter, a function of such a lens shape measurement device will be described.

(a) Measurement of a Lens Frame Shape

Before the measurement of a lens frame shape of eyeglasses or a lens shape such as a demo-lens is performed in the lens shape measurement device, the upper end of the shaft 51 of the actuator motor 50 is located in the lower end (bottom dead point) as illustrated in FIGS. 6-8. In this position, the pressure lever 47 is biased to rotate downwardly about the supporting shaft 46 by the tension coil spring 48 having a spring force stronger than that of the coil spring 43. The pressure lever 47 thereby presses the measuring element shaft 35 downwardly via the engagement shaft 44 to locate the measuring element 37 for a lens frame and the measuring element 38 for a lens in the lower end.

When measuring a lens frame shape of eyeglasses by this lens shape measurement device, as described in JP H10-328992A, for example, an eyeglass frame MF having right and left lens frames LF (RF) in FIG. 7 is placed between the slide frames 3, 3 in FIG. 1 (the eyeglass frame MF is not illustrated in FIG. 1) to sandwich the lens frames LF (RF) between the holding bars 3b1, 3b2 as illustrated in FIG. 7. This holding method is similar to that in JP H10-328992A.

The lens frames LF (RF) held between the holding bars 3b1, 3b2 are set to be located above the measuring element 37 for a lens frame before starting the measurement as illustrated in FIG. 7. More specifically, the measuring element 37 for a lens frame is located in an initial position (A) lower than the lens frames LF (RF). Moreover, as illustrated in FIG. 7, the measuring element 37 for a lens frame and the measuring element 38 for a lens are located in an initial position (i) which is the substantial center of the lens frames LF (RF) held between the holding bars 3b1, 3b2.

In this position, the photosensor 9a detects the origin of the horizontal rotation of the rotation base 9 from the light flux from the light emitter 9b, and the origin sensor 20a detects the origin of the displaced position of the slider 15.

In addition, even if the lens frame is curved in the three dimensional direction, the held portion of the lens frame by the holding bars 3b1, 3b2 has a height which is the lowest in the lens frame. In this held portion, the height of the V-groove Ym of the lens frames (LF) RF becomes a set height, namely, a lens frame shape measurement start position B.

From this state, the start switch 54 in FIG. 10A is turned on, the arithmetic control circuit 52 normally rotates the actuator motor 50, and elevates the shaft 51 by a predetermined amount to the position in FIGS. 11-14 from the position in FIGS. 6-8. In this case, the shaft 51 lifts the free end portion of the elevation position control lever 49 upward against the spring force of the tension coil spring 48, and turns the elevation position control lever 49 together with the supporting shaft 46.

Accordingly, the pressure lever 47 turns together with the supporting shaft 46, and the free end portion is elevated by a predetermined amount. By this elevation of the free end portion of the pressure lever 47, the engagement shaft 44 follows the free end portion of the pressure lever 47 to be elevated by the spring force of the coil spring 43, so that the measuring element shaft 35 is elevated by a predetermined amount.

The amount of elevation of the measuring element shaft 35, i.e., the amount of elevation of the shaft 51 by the actuator motor 50 becomes the amount L in which the leading end of the measuring element 37 for a lens frame is elevated to the height C facing the V-groove Ym in the above-described shape measurement start position (B) from the initial position (A) in FIG. 7.

Figure 12:
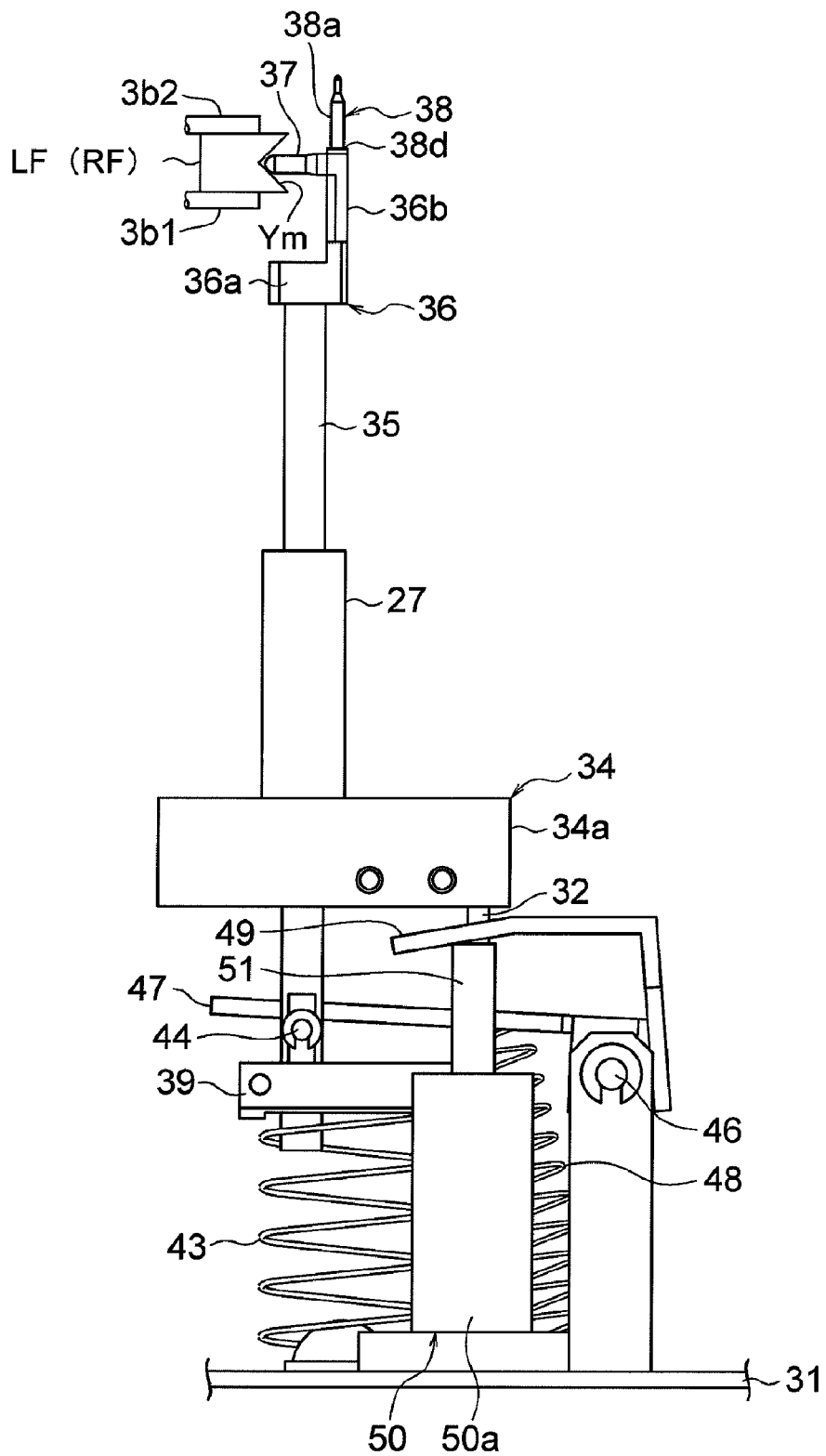
FIG. 12 is a view describing measurement of a lens frame by the moving-up-and-down mechanism in FIG. 11.

Then, the arithmetic control circuit 52 rotates the driving pulley 19 by controlling the driving of the driving motor 18, and displaces the slider 15 along the guide rail 14 by the wire 20 in FIGS. 2, 5B. In this case, the slider 15 moves in the arrow A1 direction in FIG. 7. This movement is performed until the leading end of the measuring element 37 for a lens frame has contact with the V-groove Ym as illustrated in FIG. 12 in the shape measurement start position (B). Moreover, in a state in which the leading end of the measuring element 37 for a lens frame has contact with the V-groove Ym, the measuring element 37 for a lens frame has contact with the V-groove Ym by the spring force of the coil spring 23. Then, the driving motor 18 is stopped.

In addition, when the leading end of the measuring element 37 for a lens frame has contact with the V-groove Ym, the load on the driving motor 18 is increased, so that the current flowing in the driving motor 18 is increased. Therefore, it can be detected that the leading end of the measuring element 37 for a lens frame has contact with the V-groove Ym by detecting the current change, and thus, the driving motor 18 is stopped.

Figure 15:
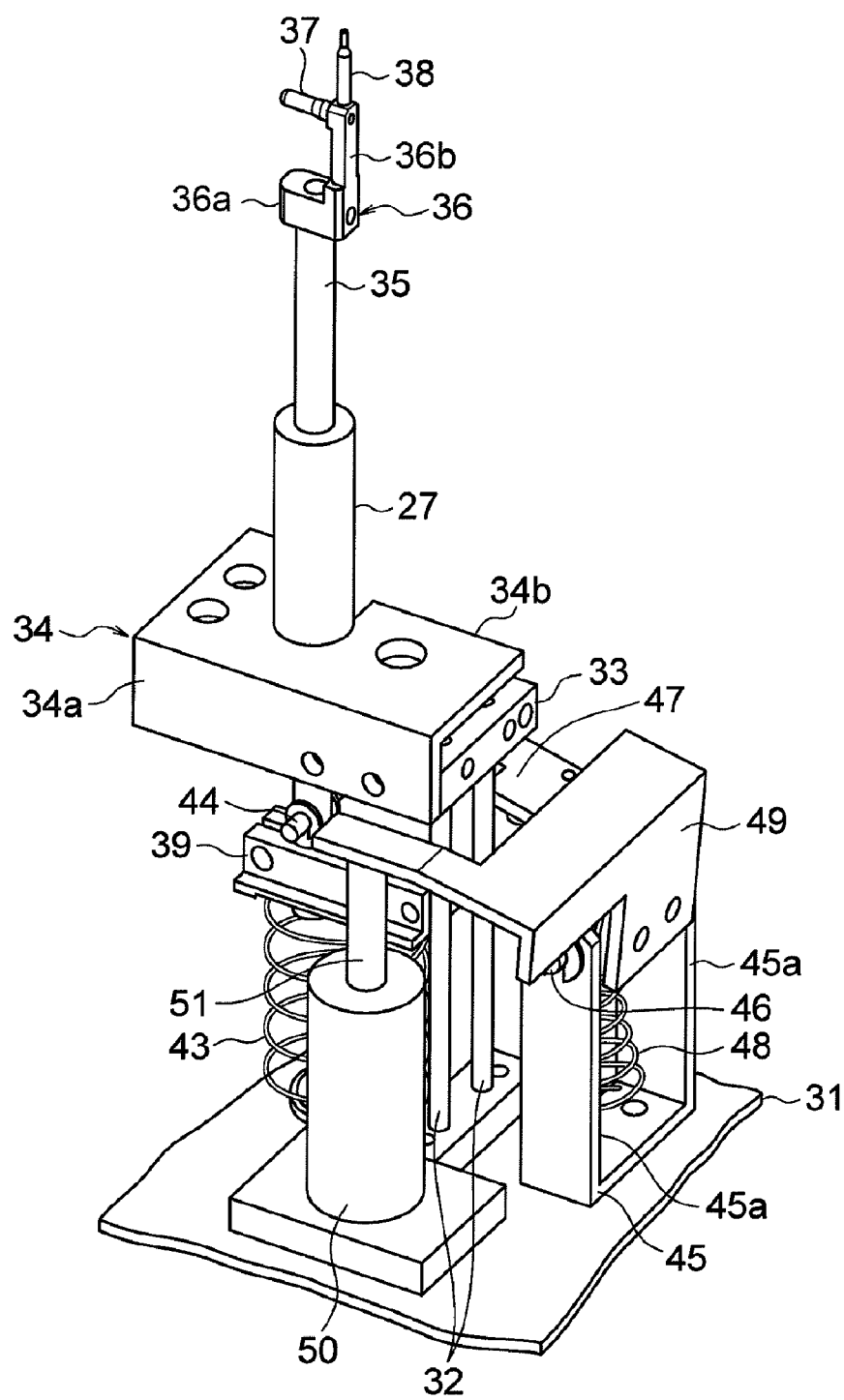
FIG. 15 is a perspective view describing the function of the moving-up-and-down mechanism of the measuring element in FIG. 6.
Figure 16:
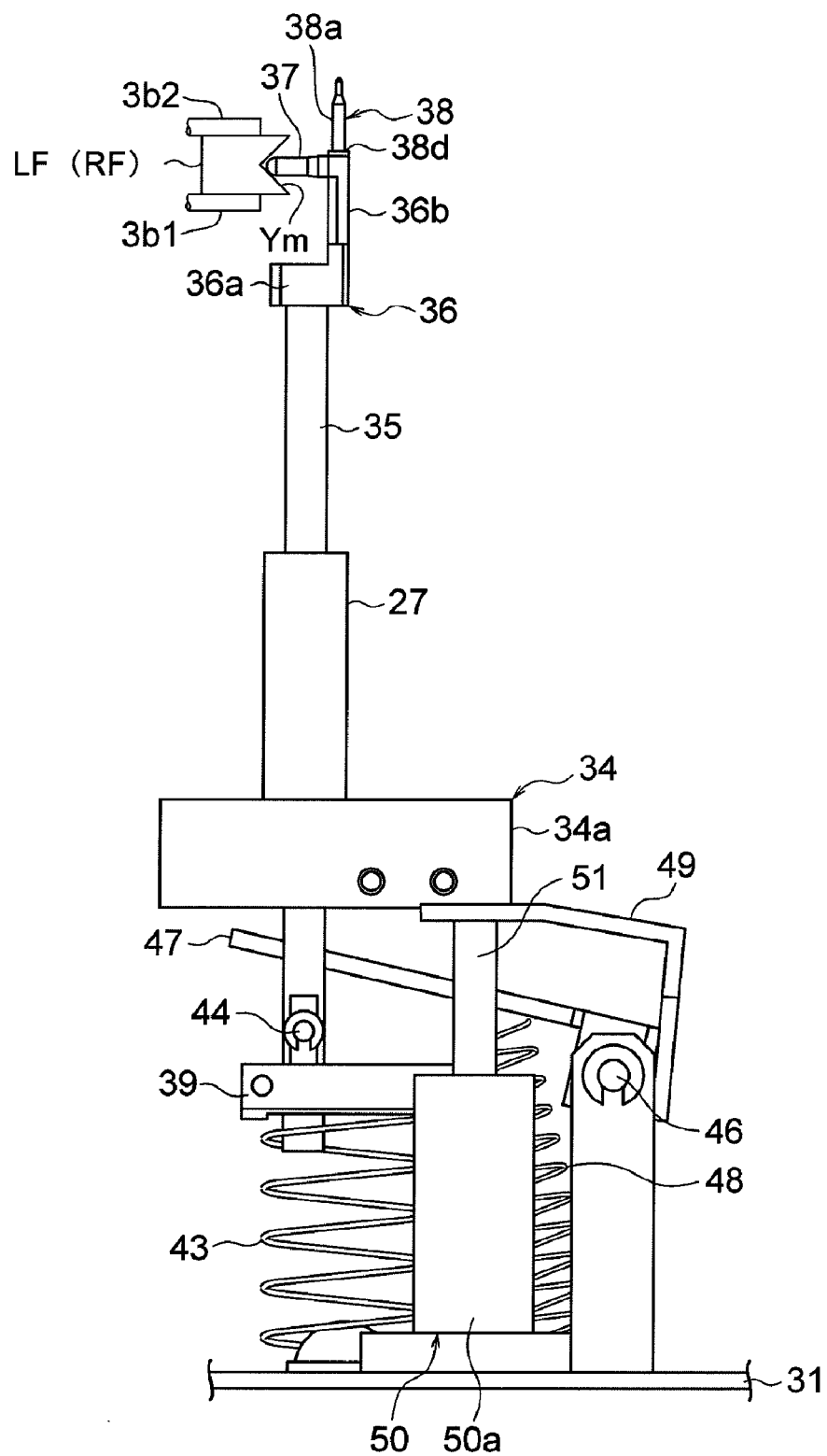
FIG. 16 is a view describing measurement of a lens frame by the moving-up-and-down mechanism in FIG. 15.
Figure 17:
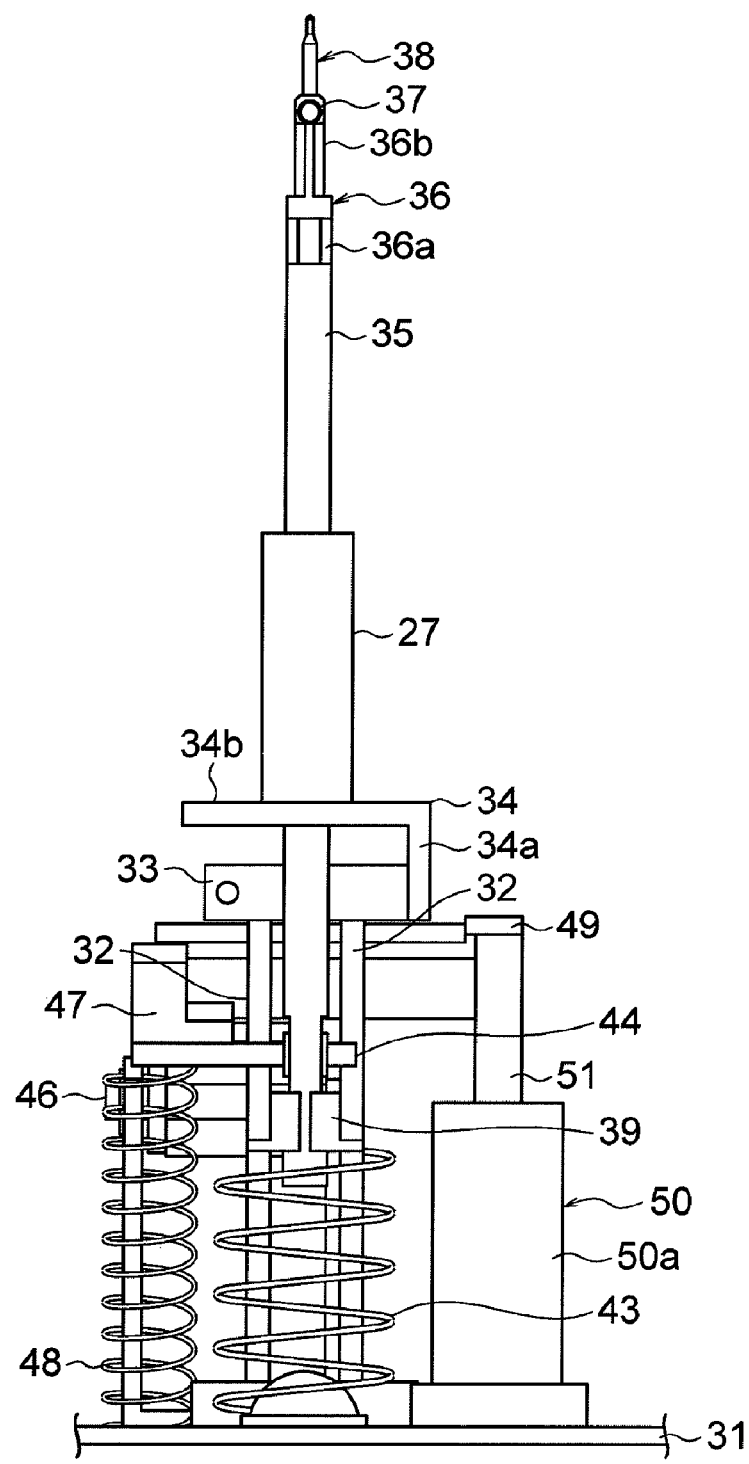
FIG. 17 is a left side view of FIG. 16.

After that, the arithmetic control circuit 52 normally rotates the actuator motor 50, and displaces the shaft 51 by a predetermined amount to the position in FIGS. 15-17 from the position in FIGS. 11-14. In this case, the shaft 51 lifts the free end portion of the elevation position control lever 49 against the spring force of the tension coil spring 48, and turns the elevation position control lever 49 together with the supporting shaft 46.

Accordingly, the pressure lever 47 turns together with the supporting shaft 46, the free end portion is elevated at predetermined amount, the free end portion of the pressure lever 47 moves away at predetermined amount from the engagement shaft 44, and the measuring element shaft 35 becomes vertically displaceable.

Next, the arithmetic control circuit 52 controls the driving of the driving motor 6 to normally rotate the driving motor 6. The rotation of the driving motor 6 is transferred to the driven gear 5 via the pinion 7 and the timing belt 8, so that the driven gear 5 horizontally rotates together with the rotation base 9 (refer to FIG. 5A).

With this rotation of the rotation base 9, the slider 15 and a number of components arranged in the slider 15 horizontally rotate together with the rotation base 9, and the leading end of the measuring element 37 for a lens frame slides along the V-groove Ym. In this case, since the slider 15 moves along the guide rail 14 together with the measuring element 37 for a lens frame, the displacement when the slider 15 is displaced from the origin position of the slider 15 becomes the same as the displacement of the leading end of the measuring element 37 for a lens frame. This displacement is obtained by the arithmetic control circuit 52 from the detection signal of the detection head 26 of the linear scale 24.

Moreover, since the measurement (length) from the center of the measuring element shaft 35 to the leading end of the measuring element 37 for a lens frame is known, if the distance from the rotation center of the rotation base 9 when the slider 15 is in the origin to the leading end of the measuring element 37 for a lens frame is set in advance, even if the distance from the rotation center of the rotation base 9 to the leading end of the measuring element 37 for a lens frame is changed when the slider 15 is displaced along the guide rail 14, the change in this distance can be a moving radius $\rho i$.

Therefore, the shape (lens frame shape) of V-groove Ym of the lens frame LF (RF) in the circumferential direction can be obtained as lens frame shape information ($\theta i$, $\rho i$) of a polar coordinate by obtaining the rotation angle $\theta i$ of the rotation base 9 by the rotation of the driving motor 9 from the number of driving pulses of the driving motor 6 and obtaining the moving radius $\rho i$ corresponding to the rotation angle $\theta i$.

When the leading end of the measuring element 37 for a lens frame slides along the V-groove Ym, if the lens frame LF (RF) has a curvature in the vertical direction, the curvature state in the vertical direction is obtained as a displacement in the vertical direction by the arithmetic control circuit 52 from the detection signal of the detection head 42 of the linear scale 40. This displacement in the vertical direction becomes a position $Zi$ in the vertical direction.

Consequently, the shape of the lens frame LF (RF) is obtained as three-dimensional lens frame shape information ($\theta i$, $\rho i$, $Zi$) by the arithmetic control circuit 52.

(b) Measurement of a Lens Such as a Demo-Lens (b-1) Setting of a Lens Such as a Demo-Lens When measuring a shape of a lens such as a demo-lens by the lens shape measurement device, a known lens holder disclosed in JP H10-328992A and JP H08-294855A, for example, can be used. In order to hold a lens such as a demo-lens in a lens holder in JP H10-328992A, a suction pad and a suction pad holding structure disclosed in JP H08-294855A can be adopted. However, the structure of this lens holder is not an essential to the present invention, so the description thereof will be omitted.

A lens such as a demo-lens is held by the above-described lens holder, the lens holder is placed between the slider frames 3, 3, and the side wall of the lens holder in JP H10-328992A or the flange of the side portion in JP H08-294855A is sandwiched between the fastening holding bar 3b1 and the movable holding bar 3b2. In this case, the lens held by the lens holder is directed on the lower side.

(b-2) Contact Operation 1 of the Measuring Element 38 for a Lens to a Standard Lens If the lens holder (not shown) is detected by the holder detector 53, this detection signal is input into the arithmetic control circuit 52. Thereby, the arithmetic control circuit 52 displaces the slider 15 by a predetermined amount along the guide rail 14 from the origin position, and locates the measuring element 38 for a lens on the lower side of the outer rim of the lens held by the lens holder (not shown).

Next, the arithmetic control circuit 52 normally rotates the above-described actuator motor 50, so as to elevate the measuring element 37 for a lens frame from the initial position (A)

to the height (B) illustrated in FIG. 7. Accordingly, the measuring element 38 for a lens is elevated together with the measuring element 37 for a lens frame, and is elevated to a height corresponding to the rim of the lens held by the lens holder (not shown).

Figure 18:
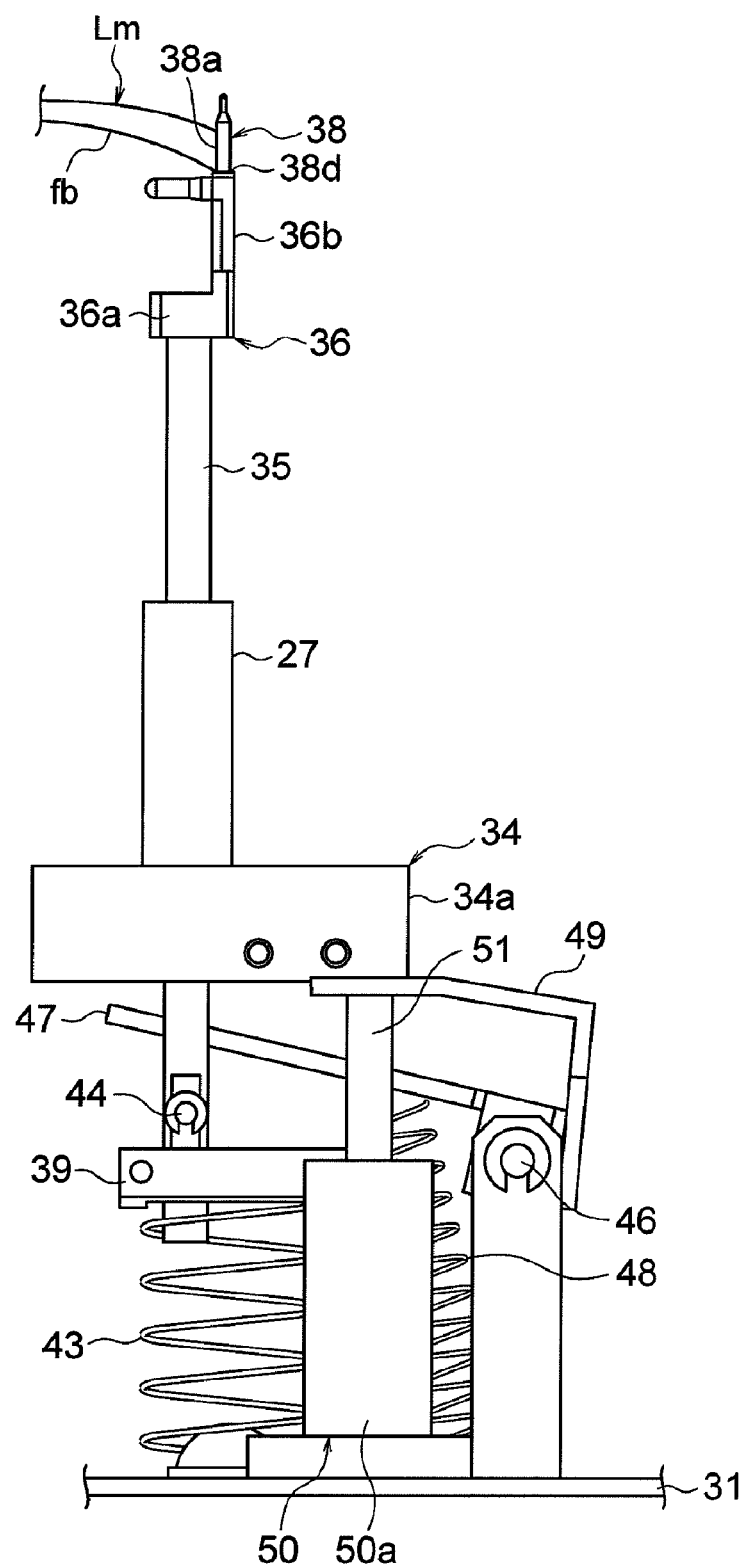
FIG. 18 is a view describing measurement of a lens by the moving-up-and-down mechanism in FIG. 2.

After that, the arithmetic control circuit 52 controls the driving of the driving motor 18, and transfers the rotation of the driving motor 18 to the slider 15 by the wire 20, and controls the displacement of the slider 15 along the guide rail 14 such that the measuring element 38 for a lens is displaced to have contact with the circumferential face of the lens Lm held by the lens holder (not shown) as illustrated in FIG. 18. After the measuring element 38 for a lens has contact with the circumferential face of the lens Lm as illustrated in FIG. 18, the driving motor 18 is stopped.

In this case, such control can be performed according to standard lens data previously obtained by an experiment and the like.

(b-2) Contact Operation 2 of the Measuring Element 38 for a Lens to a Lens

In addition, another method can be used as the method which brings the measuring element 38 for a lens into contact with the circumferential face of the lens Lm. More specifically, at first, the actuator motor 50 normally rotates to lift the free end portion of the elevation position control lever 49 to the position in FIGS. 15-17 against the spring force of the tension coil spring 48 from the position in FIG. 7, and to rotate the supporting shaft 46. In this case, the supporting shaft 46 rotates the pressure lever 47, and lifts the free end portion of the pressure lever 47 in the direction which is the same as the direction of the free end portion of the elevation position control lever 49. Accordingly, the engagement shaft 44 is elevated together with the measuring element shaft 35 by the spring force of the coil spring 43, and the measuring element 38 for a lens is elevated, so that the measuring element 38 for a lens has contact with the back side refracting surface of the lens Lm. After that, by controlling the driving of the driving motor 18, the slider 15 is displaced at a predetermined speed along the guide rail 14, the measuring element 38 for a lens is displaced on the rim portion side along the back side refracting surface of the lens Lm, and the measuring element 38 for a lens is displaced to a position which is significantly separated from the rim of the back side refracting surface of the lens Lm. In this case, even if the measuring element 38 for a lens is elevated together with the measuring element 37 for a lens frame by the spring force of the coil spring 43 out of the rim of the back side refracting surface of the lens Lm, the crushing of the measuring element 37 for a lens frame to the lens Lm can be avoided by increasing the moving speed of the measuring element 38 for a lens on some level because the spring force of the coil spring 43 is weak.

The withdrawn position of the measuring element 38 for a lens out of the back side refracting surface of the lens Lm can be determined if the linear scale 40 detects the position when the measuring element 38 for a lens is elevated. The position of the horizontal direction of the measuring element 38 for a lens in the withdrawn position can be obtained from the detection signal of the linear scale 24. Therefore, by the detection signals from the linear scales 24, 40 in the withdrawn position, the position where the measuring element 38 for a lens separates from the back side refracting surface of the lens Lm can be obtained as three-dimensional coordinate data. In addition, by controlling the driving of the actuator motor 50 according to the three-dimensional coordinate data, the height of the free end portion of the elevation position control lever 49 is adjusted, and the height of the free end portion of the pressure lever 47 is adjusted. Consequently, the measuring element 38 for a lens can be adjusted to the height corresponding to the rim of the lens Lm held by the lens holder (not shown). After that, the arithmetic control circuit 52 controls the driving of the driving motor 18 to transfer the rotation of the driving motor 18 to the slider 15 by the wire 20, and controls the displacement of the slider 15 along the guide rail 14 such that the measuring element 38 for a lens is moved to have contact with the circumferential face of the lens Lm held by the lens holder (not shown) as illustrated in FIG. 18. Then, after the measuring element 38 for a lens has contact with the circumferential face of the lens Lm, the driving motor 18 is stopped.

The pressure lever 47 accordingly turns together with the supporting shaft 46, the free end portion is elevated by a predetermined amount, and the free end portion of the pressure lever 47 separates by a predetermined amount from the engagement shaft 44, so that the measuring element shaft 35 becomes vertically moveable. As a result, the step face 38a of the circumference of the lower end of the measuring element 38 for a lens has contact with the lower end of the edge of the lens Lm by the spring force of the coil spring 43.

Next, the arithmetic control circuit 52 controls the driving of the driving motor 6 to normally rotate the driving motor 6. The rotation of the driving motor 6 is transferred to the driven gear 5 via the pinion 7 and the timing belt 8, so that the driven gear 5 horizontally rotates together with the rotation base 9.

With the rotation of the rotation base 9, the slider 15 and a number of components arranged in the slider 15 horizontally rotate together with the rotation base 9, and the measuring element 38 for a lens slides along the circumferential face (edge) of the lens Lm. In this case, since the slider 15 displaces along the guide rail 14 together with the measuring element 37 for a lens frame, the displacement when the slider 15 displaces from the origin position of the slider 15 becomes the same as the displacement of the leading end of the measuring element 37 for a lens frame. This displacement can be obtained by the arithmetic control circuit 52 from the detection signal of the detection head 26 of the linear scale 24.

Moreover, since the measurement (length) from the center of the measuring element shaft 35 to the leading end of the measuring element 37 for a lens frame is known, if the distance from the rotation center of the rotation base 9 when the slider 15 is in the origin to the leading end of the measuring element 37 for a lens frame is previously set, even if the distance from the rotation center of the rotation base 9 to the measuring element 38 for a lens is changed when the slider 15 is displaced along the guide rail 14, the change in this distance can be a moving radius $\rho i$.

Therefore, the circumferential face shape (lens shape) of the lens Lm can be obtained as lens shape information ($\theta i, \rho i$) of a polar coordinate by obtaining the rotation angle $\theta i$ of the rotation base 9 by the rotation of the driving motor 6 from the number of driving pulses of the driving motor 6 and obtaining the moving radius $\rho i$ corresponding to the rotation angle $\theta i$.

When the measuring element 38 for a lens slides along the circumferential face of the lens Lm, if the lens Lm includes a curvature in the vertical direction, the curvature state in the vertical direction can be obtained as a displacement in the vertical direction by the arithmetic control circuit 52 from the detection signal of the detection head 42 of the linear scale 40. The displacement in the vertical direction becomes a position $Zi$ in the vertical direction.

The shape of the lens Lm can be accordingly obtained as three-dimensional lens shape information ($\theta i, \rho i, Zi$) by the arithmetic control circuit 52.

Then, the arithmetic control circuit 52 calculates the three-dimensional circumferential length of the lens Lm which is a dummy lens from the lens shape information (θi, ρi, Zi).

Figure 19:
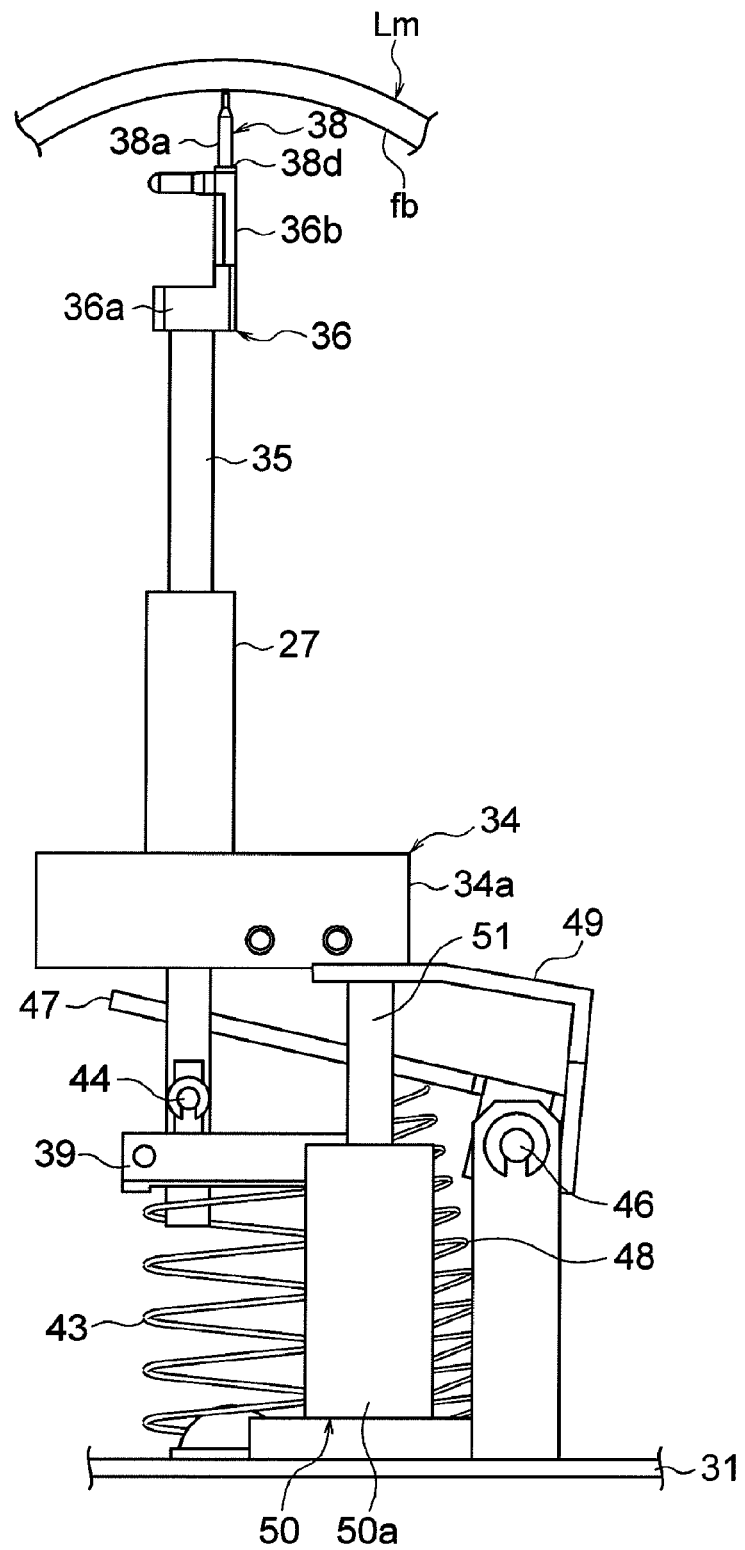
FIG. 19 is a view describing measurement of a lens by the moving-up-and-down mechanism in FIG. 2.

(c) Measurement of the Curvature of the Back Side Refracting Surface of the Lens Lm In addition, in the above (b), the three-dimensional circumferential length of the lens Lm which is a dummy lens is calculated by obtaining the three-dimensional lens shape information (θi, ρi, Zi); however, it is not limited thereto More specifically, when only two dimensional lens shape information (θi, ρi) is obtained in the rim shape measurement (outer circumferential shape measurement) of the lens Lm in the above described (b), the curvature of the back side refracting surface fb of the lens Lm illustrated in FIG. 19 is calculated by the measurement, and the position Zi of the vertical direction of the edge of the lens Lm in the lens shape information (θi, ρi) can be obtained from the calculated curvature and the lens shape information (θi, ρi), so that the three-dimensional lens shape information (θi, ρi, Zi) can be obtained. The three-dimensional circumferential length of the lens Lm which is a dummy lens can be calculated from the three-dimensional shape information (θi, ρi, Zi). Hereinafter, a process which obtains the curvature of the back side refracting surface of the lens Lm is described.

Step S1

Figure 20:
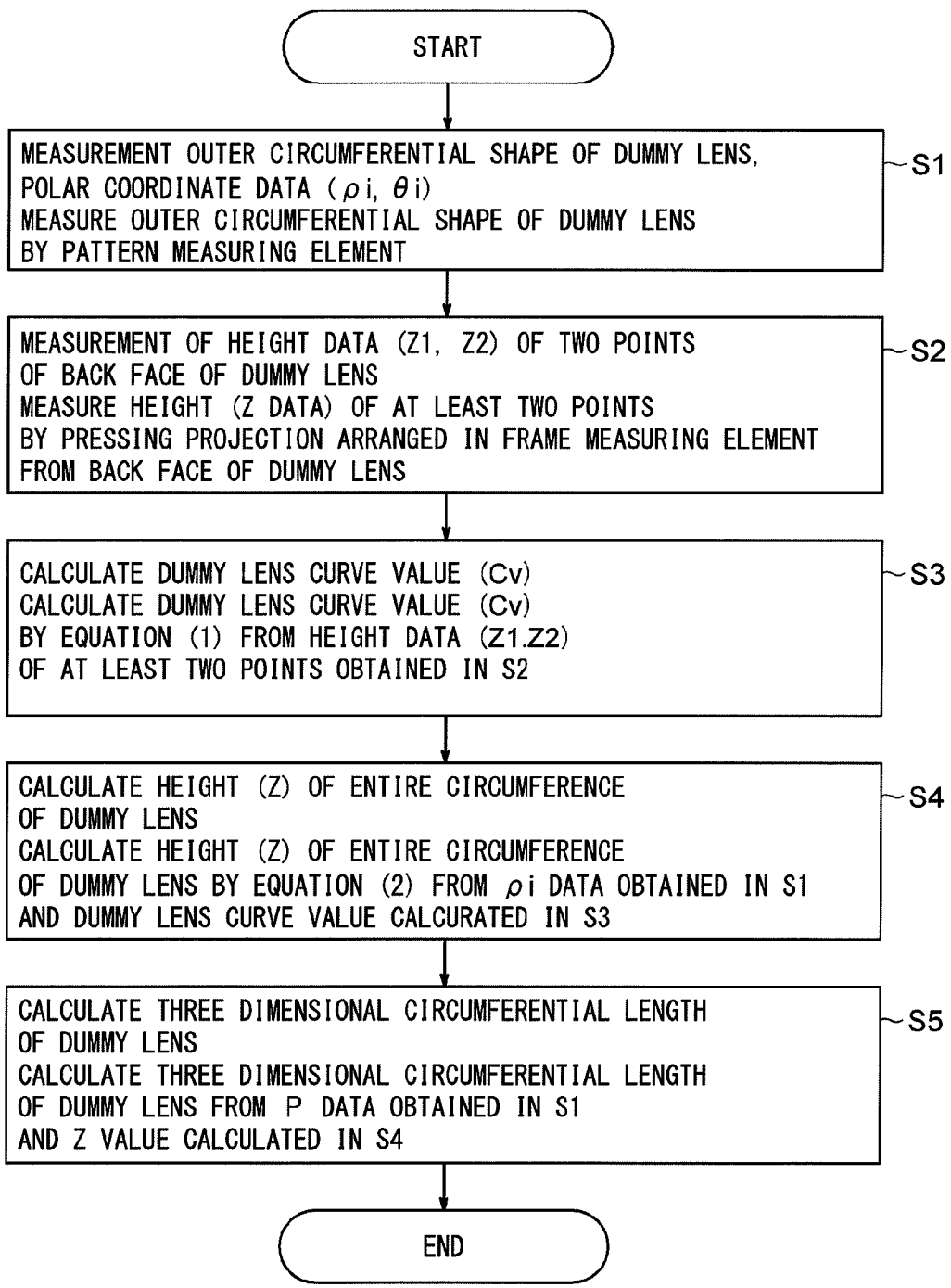
FIG. 20 is a flow chart for obtaining a curvature of a refracting surface of a lens by the lens shape measurement device in FIGS. 1-5.

As illustrated in FIG. 20, the two-dimensional lens shape information (θi, ρi) is obtained in the rim shape measurement (outer circumferential shape measurement) of the lens Lm in Step S1, then the operation moves to Step S2.

Step S2

In this Step S2, the arithmetic control circuit 52 measures the curvature of the back side refracting face fb of the lens Lm illustrated in FIG. 19. For this measurement, at first, the operation of the actuator motor 50 is controlled similar to the measurement of the lens frame in (a) as described above, and the upper end of the measuring element 38 for a lens is brought into contact with the back side refracting surface fb of the lens Lm held by the not shown lens holder with the spring force of the coil spring 43.

In this case, the lens Lm is retained by a suction pad, and this suction pad is detachably attached to the not shown lens holder, so that the lens is held by the lens holder. Moreover, in a state in which the lens holder is held between the lens frames 3, 3, it is set such that the vertically extending axis line (not shown) of the suction pad of the lens holder is aligned with the vertically extending axis line (shaft line O in FIG. 7) of the measuring element 38 for a lens when the slider 15 is in the origin position. The aligned position (aligned point) of the axis lines is set to an origin P0 in the X direction of the measurement (radius direction of lens Lm).

Figure 21A:
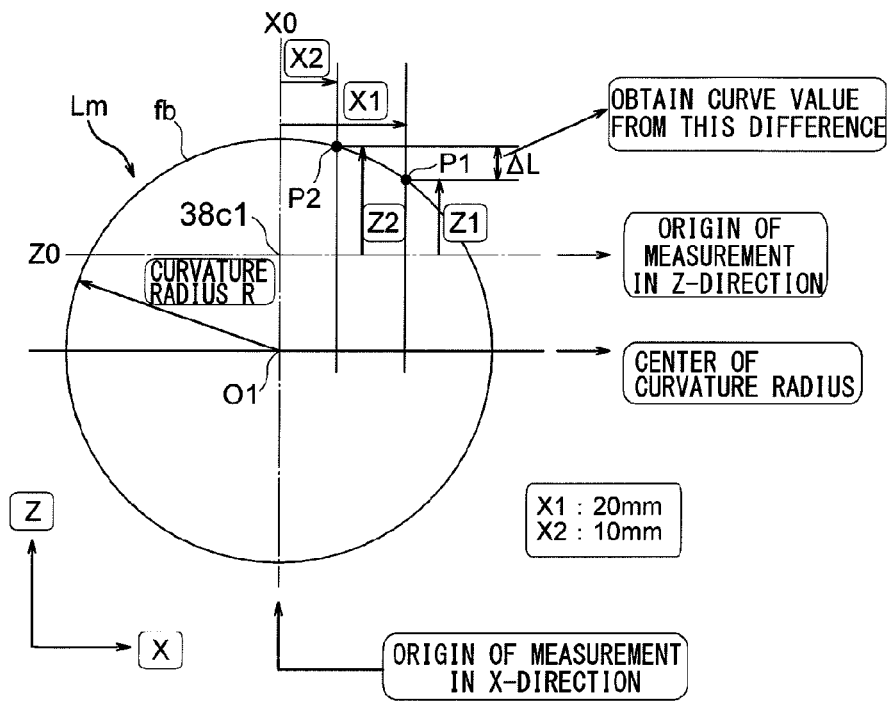
FIG. 21A is a view for obtaining a curvature of a lens by the measurement of the lens shape measurement device in FIGS. 1-5.
Figure 21B:
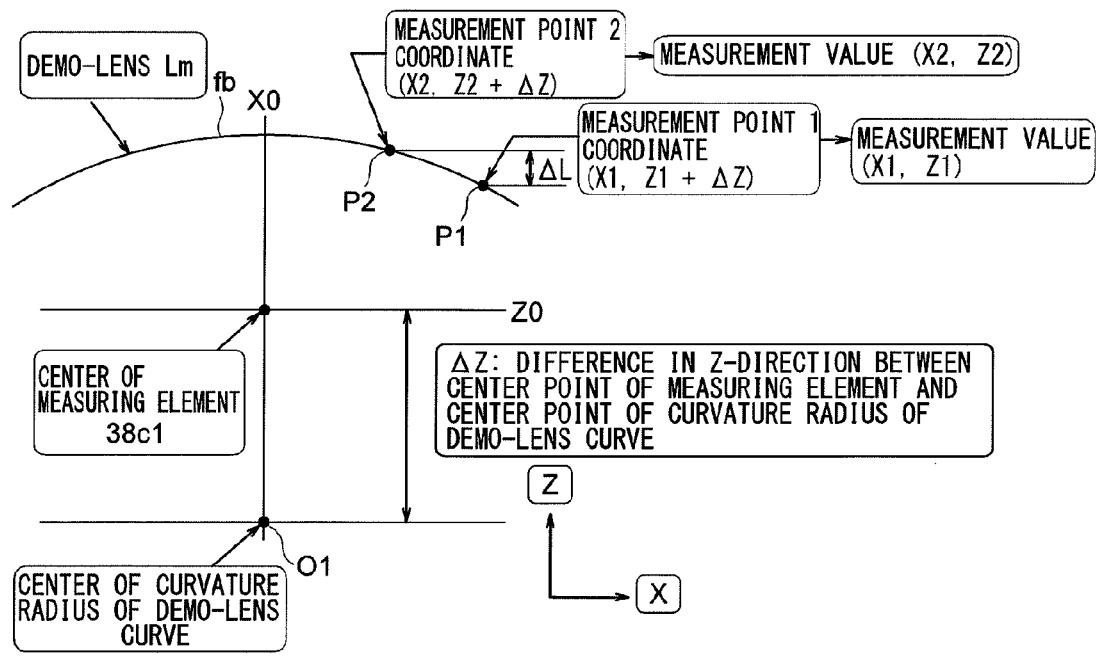
FIG. 21B is a partially enlarged view of FIG. 21A.

As illustrated in FIG. 7, when the measuring element shaft 35 is lowered on the lowermost side, as illustrated in FIG. 7, and the measuring element 37 for a lens frame is in the initial position (A), the measuring element 38 for a lens is located in the initial position on the lowermost side. The upper end (leading end) position of the measuring element 38 for a lens is set as the initial position (C), and this initial position (C) is set to the origin Z0 in the Z direction (vertical direction) of the measurement in FIGS. 21A, 21B.

In such a condition, the arithmetic control circuit 52 controls the operation of the driving motor 18, and displaces the slider 15 along the guide rail 14 by the wire 20 which works with the driving motor 18, and the upper end (leading end) of the measuring element 38 for a lens is sequentially moved to the measurement points P2, P1 of the radius direction (X direction) of the lens Lm. This measurement point P2 is a position which is moved in the radius direction (X direction) of the lens Lm at a distance X2 from the origin X0 in the X direction, and the measurement point P1 is a position which is moved in the radius direction (X direction) of the lens Lm at the distance X1 (X1>X2) from the origin X0 in the X direction.

In this case, the arithmetic control circuit 52 calculates the heights Z2, Z1 in the Z direction (vertical direction) in the distances X2, X1 of the back side refracting surface fb of the lens Lm from the displacement detection signal from the linear scale 40, and the operation moves to Step S3. The heights Z2, Z1 in the Z-direction are distances from the origin Z0 in the Z-direction.

Step 3

In this Step 3, the arithmetic control circuit 52 obtains a curve value from the curvature of the back side refracting surface fb of the lens Lm. In this case, where the distance from the curvature center O1 of the back side refracting surface fb of the lens Lm to the origin Z0 in the Z-direction is ΔZ, the height from the curvature center O1 to the measurement point P2 is Z2+ΔZ and the height from the curvature center O1 to the measurement point P1 is Z1+ΔZ. Therefore, the coordinate of the measurement point P2 is (X2, Z2+ΔZ) and the coordinate of the measurement point P1 is (X1, Z1+ΔZ).

The arithmetic control circuit 52 calculates by using a circular equation in order to obtain a curvature from the coordinate (X2, Z2+ΔZ) of the measurement point P2 and the coordinate (X1, Z1+ΔZ) of the measurement point P1. The circular equation is as follows where the curvature radius diameter of the lens Lm is R.

$$X^2+Z^2=R^2$$

The equation passing through the measurement point P1 from this equation is as follows.

$$(X1)^2+(Z1+\Delta Z)^2=R^2 \qquad (1)$$

The equation passing through the measurement point P2 is as follows.

$$(X2)^2+(Z2+\Delta Z)^2=R^2 \qquad (2)$$

The following equation is obtained from (1)-(2).

$$(X1)^2-(X2)^2+(Z1+\Delta Z)^2-(Z2+\Delta Z)^2=0$$

Then, the following equation is obtained by developing the above equation.

$$(X1)^2-(X2)^2+(Z1)^2+2(Z1)\cdot\Delta Z+\Delta Z^2-(Z2)^2-2(Z2)\cdot\Delta Z-\Delta Z^2=0$$

And, the following equation is obtained.

$$(X1)^2-(X2)^2+(Z1)^2+2(Z1)\cdot\Delta Z-(Z2)^2-2(Z2)\cdot\Delta Z=0$$

Then, the following equation is obtained if the above equation is simplified by combing ΔZ.

$$[2(Z1)-2(Z2)]\Delta Z=(X2)^2-(X1)^2+(Z2)^2-(Z1)^2$$

ΔZ can be obtained from this equation. Namely, ΔZ is as follows.

$$\Delta Z = \frac{(X2)^2 - (X1)^2 + (Z2)^2 - (Z1)^2}{2[(Z1) - (Z2)]} \qquad \text{[Equation 1]}$$

The above is obtained.

Figure 22A:
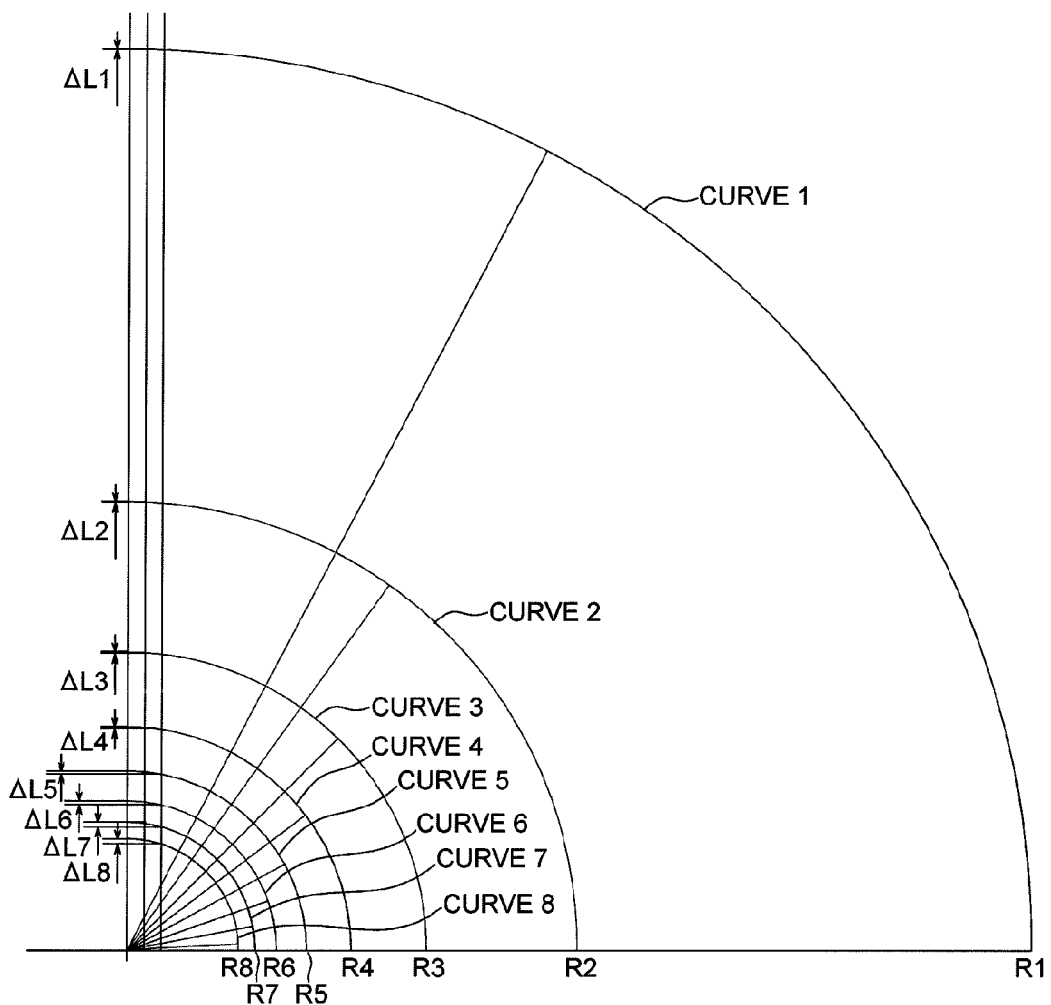
FIG. 22A is a view describing a curve value of an eyeglass lens.

Meanwhile, the curve value of the eyeglass lens is set within a range from the curve of 1 to the curve of 8 as illustrated in FIG. 22. The curvature radius R1-R8 from the curve of 1 to the curve of 8 is as illustrated in Table 1.

TABLE 1

| CURVE VALUE | CURVATURE RADIUS $R_i$ (mm) | DIFFERENCE IN Z-DIRECTION (mm) | CURVE VALUE OBTAINED FROM APPROXIMATE CURVE | ERROR FROM THEORETICAL VALUE |
|---|---|---|---|---|
| 1 | R1: 523 | ΔL1: 0.287 | 1.0479465 | 0.0479465 |
| 2 | R2: 261.5 | ΔL2: 0.575 | 2.0183625 | 0.0183625 |
| 3 | R3: 174.3333 | ΔL3: 0.854 | 2.958453 | −0.041547 |
| 4 | R4: 130.75 | ΔL4: 1.156 | 3.976042 | −0.023958 |
| 5 | R5: 104.6 | ΔL5: 1.451 | 4.9700445 | −0.0299555 |
| 6 | R6: 87.16667 | ΔL6: 1.75 | 5.977525 | −0.022475 |
| 7 | R7: 74.71429 | ΔL7: 2.054 | 7.001853 | 0.001853 |
| 8 | R8: 5.375 | ΔL8: 2.365 | 8.0497675 | 0.0497675 |

Where the above X1=10 mm and the above X2=5 mm, the Z-direction difference ΔL (ΔL-ΔL8) of the measurement points P1, P2 can be obtained corresponding to the curve of 1 to the curve of 8 as illustrated in Table 1. In other words, where the Z-direction difference (ΔL in FIG. 21) of the measurement points P1, P2 is about 0.287 of ΔL1, for example, the curvature radius of the lens Lm as a demo-lens can be determined as 523 mm of R1 corresponding to the curve of 1 (curve value 1).

In addition, the Z-direction difference (ΔL in FIG. 21) of the measurement points P1, P2 and the curve value Cv can be expressed in linear approximation, and that equation is as follows.

$$\text{Curve value} = 3.3695 \times \text{Z-direction difference } \Delta L + 0.0809$$

Figure 22B:
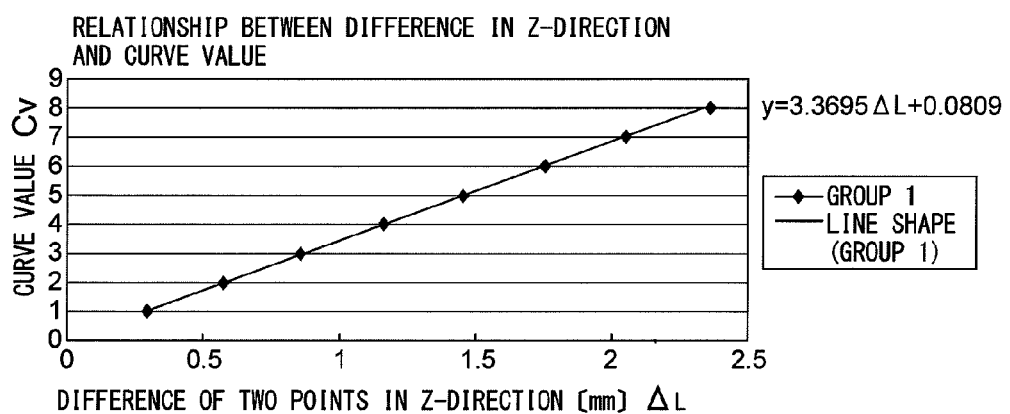
FIG. 22B is a characteristic line view illustrating a relationship between a curve value in FIG. 22A and a difference between two measurement points of a refracting surface of a lens.

The relationship between the curve value Cv and the Z-direction difference ΔL (ΔL1-ΔL8) is linearly proportional as illustrated in FIG. 22B.

As described above, the arithmetic control circuit 52 obtains the curve value of the back side refracting surface fb of the lens Lm, and the operation moves to Step S4.

Step 4

In Step S4, the arithmetic control circuit 52 obtains the positional information Zbi in the Z-direction of the rim of the back side refracting surface fb of the lens Lm from the curve value Cv obtained according to the Z-direction difference ΔL (ΔL1-ΔL8) and the lens shape information (θi, ρi), and the operation moves to Step S5.

Step 5

In Step S5, the arithmetic control circuit 52 obtains the three-dimensional lens shape information (θi, ρi, Zbi) from the two-dimensional lens shape information (θi, ρi) and the positional information Zbi of the Z-direction of the rim of the back side refracting surface fb of the lens Lm obtained in Step S4, and the step is completed. Although not illustrated in the figures, the three-dimensional lens shape information (θi, ρi, Zbi) is stored in a memory.

(d) Calculation of a Circumferential Length of Information (Data) of an Engagement Groove and Processing of an Engagement Groove for Nylor of a Rimless Frame and the Like.

If the arithmetic control circuit 52 obtains three-dimensional lens shape information (θi, ρi, Zbi) of the lens Lm, the circumferential length of the engagement groove for a rimless frame such as Nylor is obtained from the lens shape information (θi, ρi, Zbi).

On the other hand, circular unprocessed eyeglasses are selected from an eyeglass lens prescription according to refracting information of the subject eyes of a person wearing eyeglasses, this unprocessed eyeglass lens is held between a pair of lens rotation shafts of the lens grinder (not shown), and the edge thickness Wi in a position corresponding to the two-dimensional lens shape information (θi, ρi) of the unprocessed eyeglass lens is measured by an edge thickness measurement device of the lens grinder. Since a well-known configuration of the lens grinder can be adopted, the description thereof using a drawing will be omitted. In addition, when measuring the edge thickness Wi, the position Zci in the direction parallel to the lens rotation shaft of the front side refracting surface of the unprocessed eyeglass lens and the position Zdi in the direction parallel to the lens rotation shaft of the back side refracting surface of the unprocessed eyeglass lens are obtained. A known method can be adopted for obtaining these positions Zci, Zdi.

The rim of the unprocessed eyeglass lens is grinded by the lens grinder (not shown) according to the two-dimensional lens shape information (θi, ρi), so as to form an eyeglasses lens having the lens shape information (θi, ρi, Wi). After that, the engagement groove for a rimless frame such as Nylor and the like is formed on the circumferential face of the eyeglass lens having the lens shape information (θi, ρi, Wi) by using a grinding stone set in the lens grinder.

In this case, the engagement groove is formed into the shape of the three-dimensional lens shape information (θi, ρi, Zbi) on the circumferential face of the eyeglass lens having the lens shape information (θi, ρi, Wi) according to the lens shape information (θi, ρi, Zci) or the lens shape information (θi, ρi, Zbi). In addition, the engagement groove is formed in a portion having a predetermined distance from the corner portion of the refracting surface and the outer circumferential face of one lens. Therefore, the engagement groove which is formed on the circumferential face of the eyeglass lens having the lens shape information (θi, ρi, Wi) is formed to be the same as the engagement groove which is formed in the lens Lm such as a demo-lens. For this reason, it is not necessary to perform the curving process of the half-rim frame when mounting the half-rim frame of the grooved frame on the circumferential face of the eyeglass lens.

As described above, the lens shape measurement device of the present embodiment includes the lens holding unit, i.e., the lens holder (not shown) set in the measurement device main body 1, the measuring element 38 for a lens, which measures the rim shape of the lens Lm held in the lens holder, the measuring element shifter as a measurement element shifting unit (driving motor 6) which shifts along the outer circumferential face of the lens Lm, the position detector as a position detection unit (linear scales 24, 40) which detects the coordinate of the measurement element 38 for a lens shape, and the arithmetic control circuit 52 which obtains the circumferential face shape data of the lens Lm as two-dimensional information according to the detection signal from the position detector (linear scales 24, 40). The arithmetic control circuit 52 controls the measuring element shifter (driving motor 6), and brings the measuring element 38 for a lens into contact with at least two points (measurement points P1, P2)

of one of the two refracting surfaces of the lens Lm held in the lens holder, obtains the coordinate of the two points according to the detection signals from the position detector (linear scales 24, 40), and obtains the curve value Cv which is a curvature of one refracting surface of the lens from the coordinate of the two points.

According to the above configuration, by obtaining the circumferential face shape and the curvature of the refracting surface of the lens such as a demo-lens, the three-dimensional shape of a half rim can be specified even if it is a grooved frame. As a result, the engagement groove which is formed on the circumferential face of the eyeglass lens having the lens shape information ($\theta i$, $\rho i$, Wi) can be formed to be the same as the engagement groove which is formed in the lens Lm such as a demo-lens. For this reason, it is not necessary to perform the curving process and the like of the half-rim when mounting the half-rim of the grooved frame on the circumferential face of the eyeglass.

In addition, the rim shape process data of the lens can be obtained from the curve value Cv of one refracting surface of the lens and the lens shape data ($\theta i$, $\rho i$) of the outer circumferential face shape data of the lens. However, it is not always necessary to obtain the rim shape process data of the lens by the lens shape measurement device, and can be obtained by a lens rim grinder. Therefore, if the curve value Cv of one refracting surface of the lens is obtained, the shape of the engagement groove which is formed on the circumferential face of the eyeglass lens can be specified by the lens shape information ($\theta i$, $\rho i$, Wi) with the lens rim grinder, so that it is not always necessary to obtain the rim shape process data of the lens by the lens shape measurement device.

In the lens frame shape measurement device of this embodiment, the device main body 1 includes the lens frame holder and the measuring element 37 for a lens frame which measures the three-dimensional shape of the circumferential direction of the V-groove Ym of the lens frame LF (RF) held in the lens frame holder. The measuring element 38 for a lens is set in the measuring element 37 for a lens frame.

According to this configuration, the measuring element 38 for a lens is set in the measuring element 37 for a lens frame, so that the configuration of the measurement unit can be simplified.

Moreover, in the lens frame shape measurement device of this embodiment, the arithmetic control circuit 52 obtains the three-dimensional edge corner shape data (lens shape information ($\theta i$, $\rho i$, Zbi)) of the outer circumferential face and the refracting surface of the lens Lm from the curve value Cv and the circumferential shape data (lens shape information ($\theta i$, $\rho i$)) of the lens Lm, so that the three-dimensional groove position data in the circumferential direction and the edge direction to the outer circumferential face of the lens Lm can be obtained according to the three-dimensional edge corner shape data (lens shape information ($\theta i$, $\rho i$, Zbi)).

According to the above configuration, a position where the engagement groove is formed for a rim-less frame such as Nylor can be accurately obtained.

In addition, the edge corner data of the outer circumferential face and the refracting surface of the lens Lm is configured from the circumferential shape of the lens Lm and the shape in the optical axis direction of the lens Lm. Therefore, the three-dimensional edge corner shape data (lens shape information ($\theta i$, $\rho i$, Zbi)) is configured from the lens shape data ($\theta i$, $\rho i$) along the circumferential face of the lens Lm and the data Zbi in the optical axis direction of the les Lm, so that it can be the three-dimensional shape data of the edge corner between the refracting surface and the outer circumferential face of the lens.

In the lens frame shape measurement device of the embodiment, the measuring element 38 for a lens includes the circumferential measurement portion (shaft-like measurement portion 38a) which has contact with the outer circumferential face of the lens Lm and the corner measurement portion (step face 38d) which has contact with the edge corner between one refracting surface and the outer circumferential face of the lens Lm. The arithmetic control circuit 52 controls the operation of the measurement portion shifter (driving motor 6), brings the outer circumferential measurement portion (shaft-like measurement portion 38a) into contact with the outer circumferential face, shifts the corner measurement portion (step face 38d) in the circumferential direction while brining the corner measurement portion into contact with the edge corner, and obtains the three-dimensional edge corner shape data (lens shape information ($\theta i$, $\rho i$, Zbi)) according to the detection signal from the position detector (linear scale 24, 40).

According to the above configuration, the three-dimensional edge corner shape data (lens shape information ($\theta i$, $\rho i$, Zbi)) can be easily obtained.

Figure 10B:
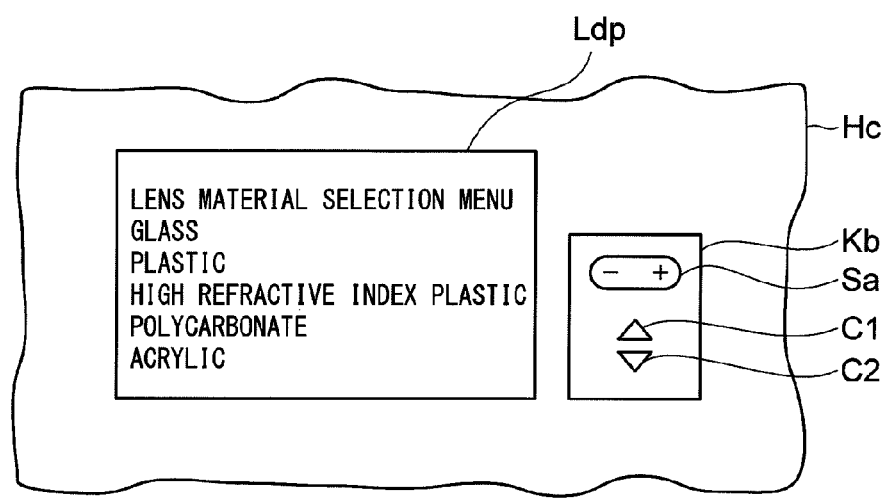
FIG. 10B is a view describing a part of a lens material input unit provided in the lens shape measurement device illustrated in FIG. 1.
Figure 10C:
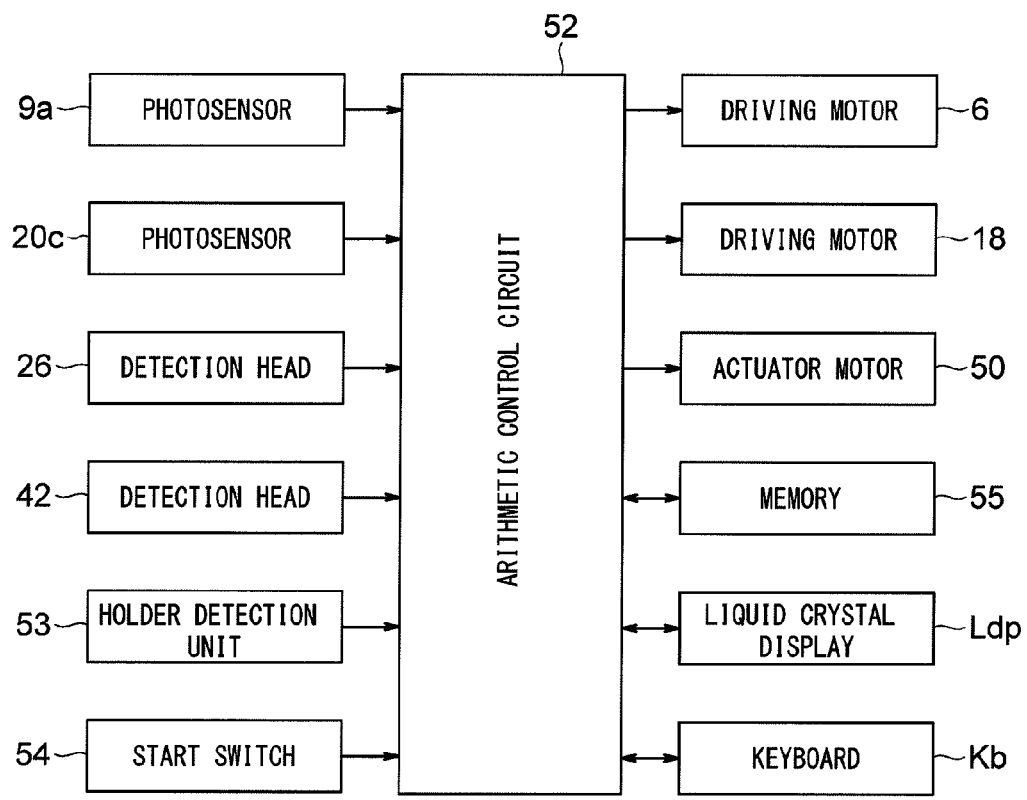
FIG. 10C is a control circuit diagram having the lens material input unit in FIG. 10B.
Figure 11:
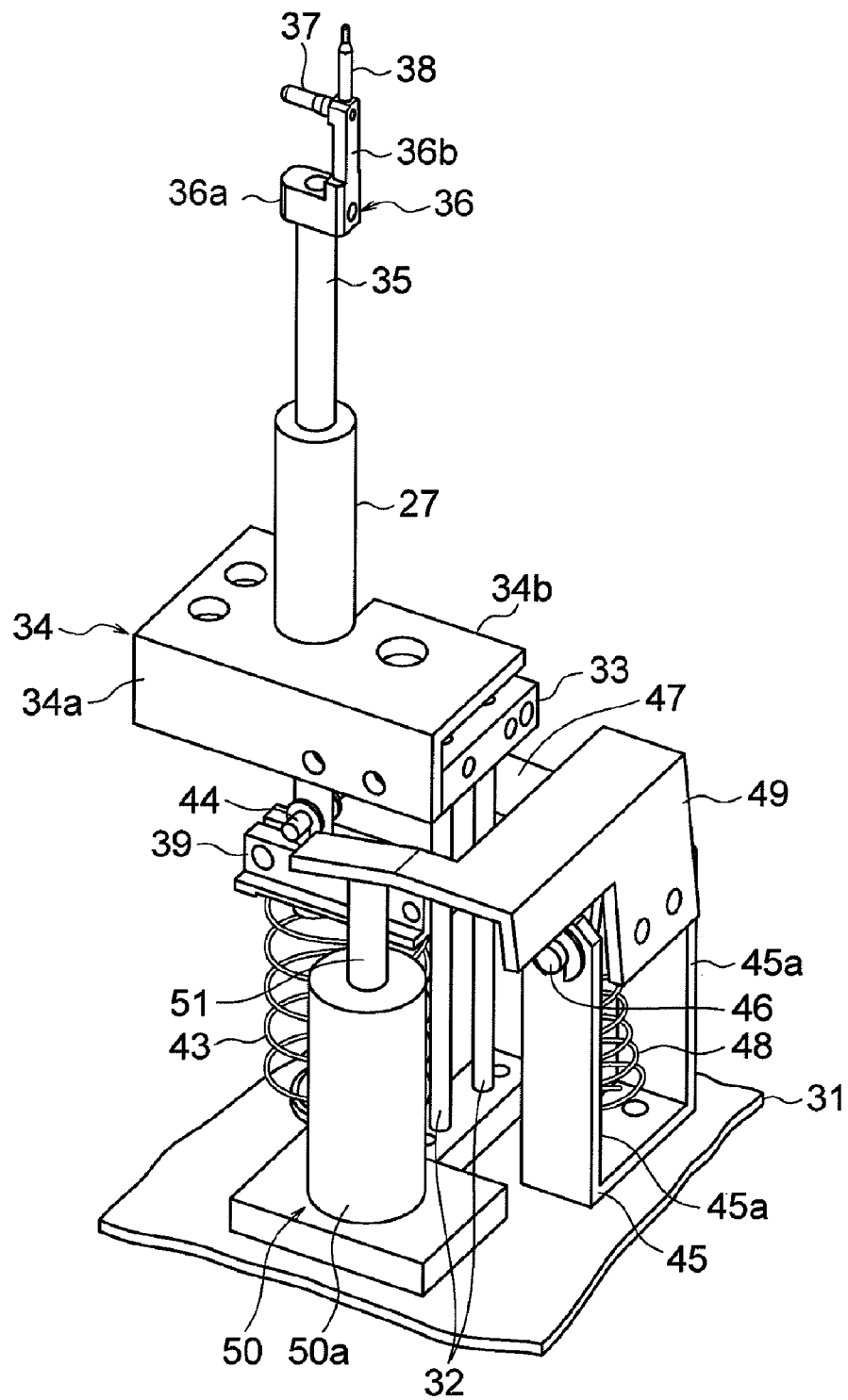
FIG. 11 is a perspective view describing a function of the moving-up-and-down mechanism of the measuring element in FIG. 6.

The lens frame shape measurement device of the present embodiment can include a material input unit which inputs a material of a lens. For example, since a part of the upper portion, the side face and the lower portion of the device main body 1 in FIG. 1 is covered by a main body case Hc (not illustrated in FIG. 1) illustrated in FIG. 10B, a liquid crystal display Ldp is set in the main body case Hc as a display unit, and a material selection menu of a lens material is displayed on the liquid crystal display Ldp. A key board Kb which selects a lens material from the material selection menu can be provided, and this key board Kb can be a lens material input unit This key board Kb includes "−+" switch Sa or "Δ" cursor key c1, "▼" cursor key c2, and the operation of "−+" switch Sa or "Δ" cursor key c1, "▼" cursor key c2 is input into the arithmetic control circuit 52 in FIG. 10C. The arithmetic control circuit 52 controls the liquid crystal display Ldp, and displays the lens material selection menu such as "glass", "plastic", "high refractive index plastic", "polycarbonate" and "acrylic" on the liquid crystal display Ldp.

The arithmetic control circuit 52 selects any of the lens materials such as "glass", "plastic", "high refractive index plastic", "polycarbonate", "acrylic" displayed on the liquid crystal display Ldp by the operation of "−+" switch Sa or "Δ" cursor key c1, "▼" cursor key c2. In addition, a touch sensor can be provided on the liquid crystal display Ldp, and this touch sensor can be used as the lens material input unit.

The arithmetic control circuit 52 obtains the three-dimensional edge thickness data in the circumferential direction of the lens Lm from the circumferential face shape data and the lens material input by the material input unit, and the three-dimensional groove position data in the circumference direction and the edge direction to the outer circumferential face of the lens can be obtained according to the three-dimensional edge corner shape data (lens shape information ($\theta i$, $\rho i$, Zbi)) and the three-dimensional edge thickness data (lens shape information ($\theta i$, $\rho i$, Zbi)).

According to the above configuration, since the three-dimensional groove position data can be obtained, the groove process on the circumferential face of the eyeglass lens can be accurately conducted by using the three-dimensional groove position data.

The invention claimed is:

1. A lens shape measurement device, comprising:
a lens holder set in a measurement device main body;
a measuring element for a lens configured to measure a rim shape of a lens held in the lens holder;
a measuring element shifter configured to displace the measuring element for a lens along an outer circumferential face of the lens;
a position detector configured to detect a coordinate of the measuring element for a lens; and
an arithmetic control circuit configured to obtain circumferential face shape data of the lens according to a detection signal from the position detector as two-dimensional information, bring the measuring element for a lens into contact with at least two points of one of two refracting surfaces of the lens held in the lens holder by controlling the measuring element shifter, obtain coordinates of the two points according to the detection signal from the position detector, and obtain a curve value which is a curvature of one refracting surface of the lens from the coordinates of the two points.

2. The lens shape measurement device according to claim 1, wherein the measurement device main body includes a lens frame holder and a measuring element for a lens frame which measures three-dimensional shape of a circumference direction of a V-groove of a lens frame held in the lens frame holder, and
the measuring element for a lens is set in the measuring element for a lens frame.

3. The lens shape measurement device according to claim 1, wherein the arithmetic control circuit obtains three-dimensional edge corner shape data of an edge corner between the refracting face and the outer circumferential face of the lens from the curve value and circumferential face shape data of the lens, and obtains three-dimensional groove position data in a circumferential direction and an edge direction to the outer circumferential face of the lens according to the three-dimensional edge corner shape data.

4. The lens shape measurement device according to claim 3, comprising a material input unit which inputs a material of a lens, wherein
the arithmetic control circuit obtains three-dimensional edge thickness data in the circumferential direction of the lens from the circumferential shape data and the material of the lens input by the material input unit, and obtains the three-dimensional groove position data in the circumferential direction and the edge direction to the outer circumferential face of the lens according to the three-dimensional edge corner shape data and the three-dimensional edge thickness data.

5. The lens shape measurement device according to claim 1, wherein the measuring element for a lens includes a circumferential face measurement portion which has contact with the outer circumferential face of the lens and a corner measurement portion which has contact with an edge corner between the one refracting face and the outer circumferential face of the lens.

* * * * *